United States Patent
Koudar et al.

(10) Patent No.: US 10,165,358 B2
(45) Date of Patent: Dec. 25, 2018

(54) TRANSDUCER CONTROLLER AND METHOD THEREFOR

(71) Applicant: SEMICONDUCTOR COMPONENTS INDUSTRIES, LLC, Phoenix, AZ (US)

(72) Inventors: Ivan Koudar, Modrice (CZ); Jan Ledvina, Tovacov (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 250 days.

(21) Appl. No.: 14/919,030

(22) Filed: Oct. 21, 2015

(65) Prior Publication Data

US 2016/0173981 A1    Jun. 16, 2016

Related U.S. Application Data

(60) Provisional application No. 62/090,452, filed on Dec. 11, 2014.

(51) Int. Cl.
| | |
|---|---|
| *H04R 3/00* | (2006.01) |
| *G01S 7/524* | (2006.01) |
| *G01S 15/10* | (2006.01) |
| *G01S 3/801* | (2006.01) |
| *G01S 3/86* | (2006.01) |
| *H04R 17/00* | (2006.01) |
| *H04S 7/00* | (2006.01) |

(52) U.S. Cl.
CPC .............. *H04R 3/002* (2013.01); *G01S 3/801* (2013.01); *G01S 3/86* (2013.01); *G01S 7/524* (2013.01); *G01S 15/10* (2013.01); *H04R 3/00* (2013.01); *H04R 17/00* (2013.01); *H04S 7/00* (2013.01); *H04S 2420/01* (2013.01)

(58) Field of Classification Search
CPC ......... H04R 3/00; H04R 3/02; G01S 7/52026; G01S 15/102; G01S 15/00; G01S 15/10; G01S 7/52
See application file for complete search history.

(56) References Cited

U.S. PATENT DOCUMENTS

| | | | | |
|---|---|---|---|---|
| 4,195,284 A | * | 3/1980 | Hampshire | G10K 9/122 340/384.6 |
| 4,297,626 A | * | 10/1981 | Chiang | G01R 31/34 318/611 |
| 4,743,924 A | * | 5/1988 | Scardovi | B41J 2/04541 347/10 |
| 5,191,616 A | * | 3/1993 | Yokoyama | H04R 3/002 381/121 |
| 5,277,065 A | * | 1/1994 | Leszczynski | G01F 23/2962 367/903 |

(Continued)

FOREIGN PATENT DOCUMENTS

| | | |
|---|---|---|
| DE | 10136628 A1 | 2/2003 |
| DE | 102014107311 A1 | 11/2015 |

(Continued)

*Primary Examiner* — Hovhannes Baghdasaryan
(74) *Attorney, Agent, or Firm* — Robert F. Hightower

(57) ABSTRACT

In an embodiment, a transducer controller is configured to apply a damping signal to reduce energy stored in the transducer after the transducer has been driven with a drive signal to form a transmitted acoustic signal.

20 Claims, 11 Drawing Sheets

(56) References Cited

U.S. PATENT DOCUMENTS

| | | | | |
|---|---|---|---|---|
| 5,712,598 A | * | 1/1998 | Tomikawa | H01L 41/042 331/105 |
| 5,757,392 A | * | 5/1998 | Zhang | B41J 2/04581 347/14 |
| 9,333,535 B2 | * | 5/2016 | Barkin | B06B 1/0207 |
| 2003/0035342 A1 | * | 2/2003 | Harrington | G01S 7/52026 367/127 |
| 2003/0155740 A1 | * | 8/2003 | Lammer | A63C 5/075 280/602 |
| 2008/0122453 A1 | * | 5/2008 | Hunter | G01D 3/032 324/661 |
| 2013/0094107 A1 | * | 4/2013 | Setiadi | G11B 5/607 360/234.3 |
| 2013/0236034 A1 | * | 9/2013 | Munenaga | H03F 3/2173 381/120 |

FOREIGN PATENT DOCUMENTS

| | | | | |
|---|---|---|---|---|
| GB | 2483337 A | * | 3/2012 | G01S 7/52004 |
| GB | 2483337 A | | 3/2012 | |

\* cited by examiner

TRANSDUCER CONTROLLER AND METHOD THEREFOR

PRIORITY CLAIM TO PRIOR PROVISIONAL FILING

This application claims priority to prior filed Provisional Application No. 62/090,452 entitled "TRANSDUCER CONTROLLER AND METHOD THEREFOR" filed on Dec. 11, 2014, and having common inventors Ivan Koudar et al. which is hereby incorporated herein by reference The present invention relates, in general, to electronics, and more particularly, to semiconductors, structures thereof, and methods of forming semiconductor devices.

BACKGROUND OF THE INVENTION

There often is a need for a distance measuring system. For example, many automobiles include distance measurement systems to assist in detecting distances during parking the automobile and some even include an automatic parking system which utilizes the distance measurement system. Many distance measurement systems were based on ultrasonic principle and utilized a piezoelectric transducer that was controlled by electronics or other circuitry. In some systems, the piezoelectric transducer was used for both transmitting acoustic waves and receiving reflected acoustic waves. During transmission, the piezoelectric transducer acted as a resonator. When the transmission was terminated, the piezoelectric transducer typically would self-oscillate or reverberate such as at a resonant frequency of the transducer. The reverberating could saturate the receiver circuits and prevent using the receiver circuits to detect reflected acoustic waves or echoes. If the resonator was attached to a moving object, the time during which the transducer as reverberating could result in inaccurate spatial measurements. This was sometimes referred to as a blind zone.

In some applications, a resistor may have been added in parallel with the piezoelectric transducer in order to reduce the reverberation time. However, the parallel resistor also reduced the signal received by the electronics that may be connected to the transducer.

Thus, it may be desirable to have a circuit that improves the accuracy of the distance measurement, or that reduces the self-oscillation or resonation of the transducer.

Figure 1:
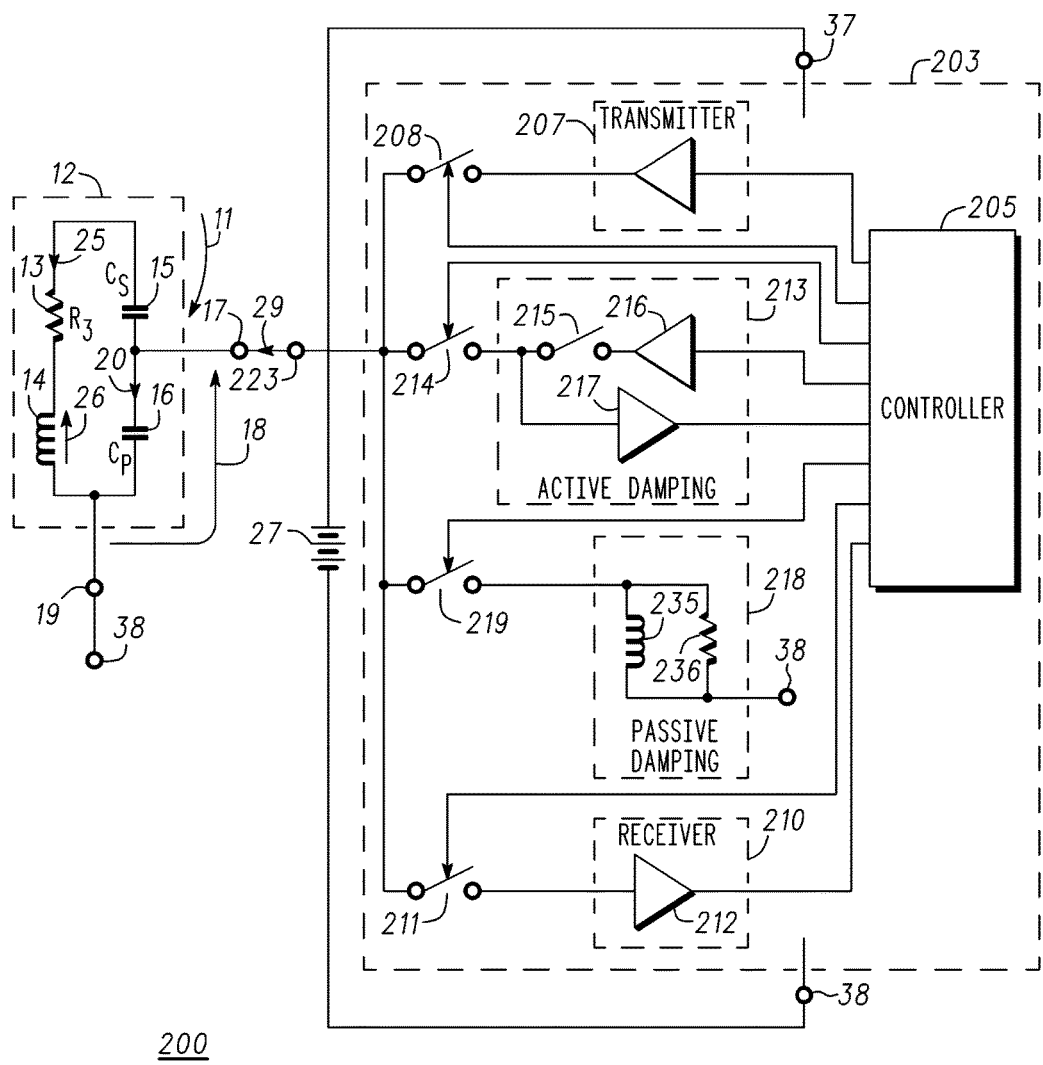
FIG. 1 schematically illustrates an example of an embodiment of a portion of an acoustic system that includes an acoustic transducer controller in accordance with the present invention.

For simplicity and clarity of the illustration(s), elements in the figures are not necessarily to scale, some of the elements may be exaggerated for illustrative purposes, and the same reference numbers in different figures denote the same elements, unless stated otherwise. Additionally, descriptions and details of well-known steps and elements may be omitted for simplicity of the description. As used herein current carrying element or current carrying electrode means an element of a device that carries current through the device such as a source or a drain of an MOS transistor or an emitter or a collector of a bipolar transistor or a cathode or anode of a diode, and a control element or control electrode means an element of the device that controls current through the device such as a gate of an MOS transistor or a base of a bipolar transistor. Additionally, one current carrying element may carry current in one direction through a device, such as carry current entering the device, and a second current carrying element may carry current in an opposite direction through the device, such as carry current leaving the device. Although the devices may be explained herein as certain N-channel or P-channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described. In some cases, reasonable variances for bias currents may be up to forty percent (+/−40%). When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein. Reference to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but in some cases it may. Furthermore, the particular features, structures or characteristics may be combined in any suitable manner, as would be apparent to one of ordinary skill in the art, in one or more embodiments.

DETAILED DESCRIPTION OF THE DRAWINGS

FIG. 1 schematically illustrates example of an embodiment of a portion of an acoustic system 200 that includes an acoustic transducer circuit or acoustic transducer controller 203 that may be configured to provide more efficient operation of system 200 and to provide more effective measurements. System 200 typically includes an acoustic transducer 12. In one embodiment, transducer 12 may be an ultrasonic transducer. Transducer 12 may have a variety of implementations including being configured as a piezoceramic element with an attached membrane for acoustic interface. Other embodiments of transducer 12 may have various other forms including having a separate transmitter, such as for example an ultrasonic transmitter that transmits ultrasonic sound waves, and a receiver, such as for example an ultrasonic receiver that receives ultrasonic sounds or waves. Although transducer 12 is illustrated as a two (2) terminal transducer, the methods and circuits described herein are applicable as to transducers having three (3) or more terminals.

As will be seen further hereinafter, controller 203 is configured to control transducer 12 to form a measurement cycle in order to measure a distance. An embodiment of controller 203 may be configured to form the measurement cycle to include a driving phase or transmission phase that may include driving transducer 12 with a drive signal having a first period or driving period to form a transmitted acoustic signal, a subsequent second phase or damping phase which includes reducing energy stored in transducer 12 or minimizing self-oscillations or reverberations of transducer 12, and a third phase or distance measuring phase which may include receiving a signal that is representative of a reflected acoustic signal or echo. In other embodiments, the damping phase may not be a portion of the measurement cycle and, in some embodiments, the damping phase may be a portion of either the transmission or distance measuring phase. In an embodiment, the damping phase may be divided into other phases such as for example an active damping phase and a passive damping phase. Controller 203 may include embodiments that are configured to apply a damping signal or damping signals to transducer 12 during the active damping phase to reduce the energy stored in transducer and to reduce the reverberation time interval thereof. Some embodiments of the active damping phase may be further sub-divided into other sub-phases including an open-loop active damping sub-phase or open-loop phase and a closed-loop active damping sub-phase or closed-loop phase. In other embodiments, one of the open-loop or closed loop phases may be omitted. In an embodiment, the passive damping phase may be omitted.

Controller 203 may be configured to receive an input voltage, such as for example a voltage V+, for operating controller 203 from a voltage source 27 that is connected between a voltage input terminal or terminal 37 and a common return terminal 38 of controller 203. Although voltage source 27 is illustrated as a battery, those skilled in the art will appreciate that it may be any source of d.c. voltage such as for example a regulated power supply. Terminal 38 may be configured to be coupled to a common reference voltage such as a ground reference or other common voltage. An embodiment of controller 203 may include a controller circuit or controller 205, a transmission circuit or TX circuit 207, a receiver circuit or Rx circuit 210, an active damping circuit 213, and a passive damping circuit 218. Circuit 218 may have an embodiment that includes an inductor 235 connected in parallel with a resistor 236. An embodiment of controller 203 may also include a transmission switch 208, and active damping switch 214, an active damping drive switch 215, a passive damping switch 219, and a receiver switch 211. Receiver switch 211 and/or active damping switch 214 may be omitted in some embodiments. In some embodiments switch 215 may be omitted instead of switch 214. In other embodiments, other illustrated circuits of controller 203 may also be omitted. Some embodiments of controller 203 may have some of or all of circuits 205, 207, 210, 213, and 218, and some of or all of switches 208, 211, 214, and 219, commonly formed on a single semiconductor die. Those skilled in the art will also appreciate that controller 203 may also include other circuits that are not illustrated in FIG. 1 for clarity of the illustration and description. The skilled artisan will also appreciate that the connections between some of the circuits or switches illustrated in FIG. 1 can either be single ended or differential. Additionally, the functionality provided by controller 203 may be shared among controller 205 and some of circuits 207, 210, 213, and 218.

Controller 205 may be configured to receive various operational signals of controller 203 and to form control signals to control some of the operation of controller 203. In an embodiment, controller 205 may be configured to form control signals to control at least a portion of the operation of the transmission phase, the damping phase, and the distance measuring phase. Controller 203 may be configured to enable switch 208 and TX circuit 207 to excite transducer 12 or drive transducer 12, such as for example as a part of the transmission phase of a measurement cycle. For example, the driving of transducer 12 may be intended to form a transmitted acoustic signal. Tx circuit 207 may include an output that is configured to be coupled to an output 223 of controller 203 to provide the drive signal to transducer 12. For example, an embodiment of controller 203 or controller 205 may be configured to enable switch 208 to couple the output of circuit 207 to transducer 12. In some embodiments Tx circuit 207 or portions thereof may be included as a part of circuit 213 such that portions of circuit 213 may assist in forming the drive signal during the transmission phase. In an embodiment, receiver circuit 210 may be configured to be coupled to transducer 12 in order to receive an electrical signal from transducer 12 that is representative of an echo or a reflected acoustic wave received by transducer 12. An embodiment of circuit 210 may include a receiver amplifier 212 in addition to other circuitry (not shown) that is configured to receive the electrical signal from transducer 12. Receiver circuit 210 may also include other circuitry to assist in utilizing the received signal to perform a distance measuring operation.

Controller 203 may be configured provide the drive signal to excite transducer 12 during the transmission phase. In some embodiments, the drive signal may be an a.c. signal that oscillates at a drive frequency. In an embodiment, the drive frequency may be substantially the same as or near to the resonant frequency of transducer 12. At the end of the transmission phase, controller 203 terminates the drive signal. After the drive signal is terminated, transducer 12 has stored energy. Those skilled in the art will appreciate that transducer 12 typically will reverberate for some period of time or time interval after the drive signal is removed. In some embodiments, the stored energy may result in a circulating current 25 that may flow within transducer 12. This resonation generally is referred to as reverberation and the period of each cycle of the reverberations of transducer 12 may be referred to as the reverberation period (RVBP) and the frequency of the reverberations may be referred to as the reverberation frequency. Those skilled in the art will understand that the reverberation period may be different from the period of the transmitted acoustic wave and may be different from the period of the drive frequency.

During the reverberations, current 25 may alternately circulate within transducer 12 in a counter-clockwise direction, such as from counter-clockwise from capacitor 15 to resistor 13 and inductor 14, and then may circulate within transducer 12 in a clockwise direction, such as for example from capacitor 15, to inductor 14 and resistor 13. Those skilled in the art will appreciate that the total reverberation current flowing into or out of transducer 12 through terminals 17 and 19 during the reverberation interval may include current 25 plus a parasitic current from capacitor 16 illustrated as a current 20. For purposes of explanation, current 25 is regarded as having a positive value if circulating in the direction of the arrow illustrated in FIG. 1, and as having a negative value if circulating in a direction that is opposite to the arrow. Current 25 results in an induced voltage 26 formed on or alternately across inductor 14. In another embodiment, current 25 may be considered to have the positive value if circulating counterclockwise and to have a negative value if circulating clockwise.

When transducer 12 reverberates, energy that is stored in inductor 14 is transferred to capacitors 15 and 16 in the form of current 25 during a portion of reverberation period and is stored in form of respective voltages 11 and 18. Those skilled in art will understand that capacitors 15 and 16 might form a capacitor divider that divides total stored voltage into voltages 11 and 18 if the divider is not loaded (for example if the current 29 into terminal 17 is substantially zero). In next portion of reverberation cycle energy flows from capacitors 15 and 16 back to inductor 14 and then again to capacitors etc. . . . . Those skilled in the art will understand that during each cycle some amount of energy may be dissipated in resistor 13.

Figure 2:
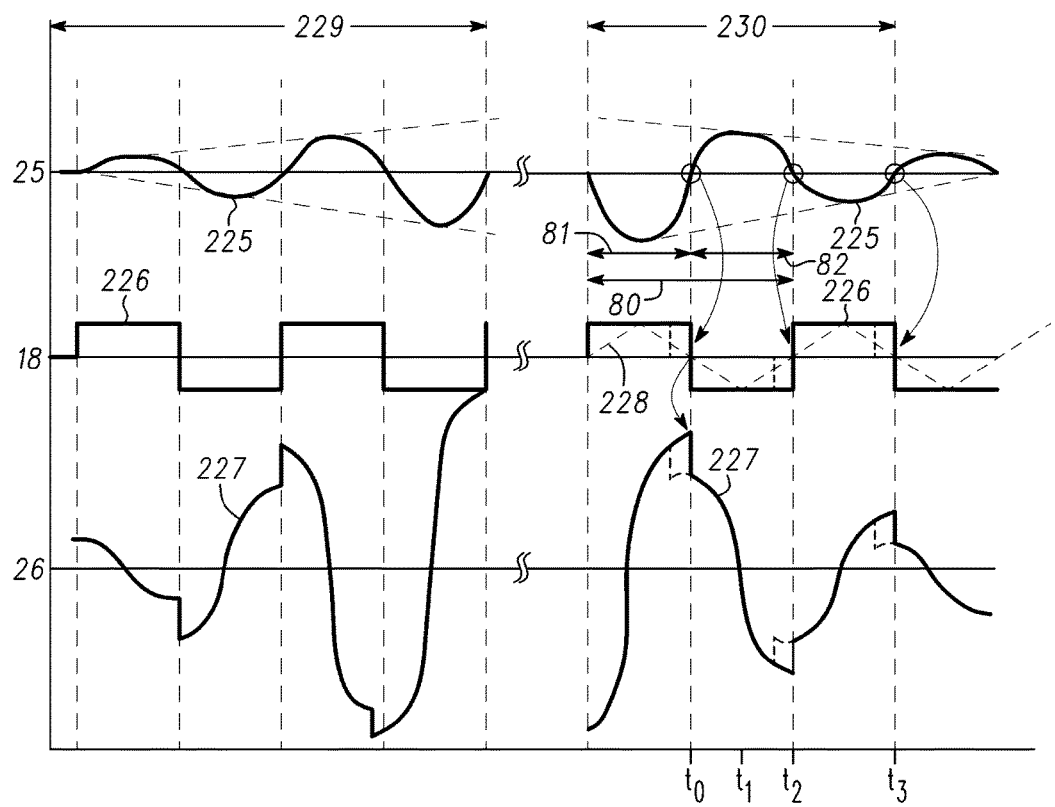
FIG. 2 is a graph having plots that illustrate in a general manner a non-limiting example some of the signals formed during some operations of the acoustic transducer controller of FIG. 1 in accordance with the present invention.

FIG. 2 is a graph having plots that illustrate in a general manner some of the signals that may be formed by system 200 during the operation of an embodiment of controller 203. A plot 225 illustrates current 25, and a plot 226 illustrates a voltage 18 between output 223 and terminal 38, or alternately between terminals 17 and 19 of transducer 12. A plot 227 illustrates induced voltage 26. The abscissa indicates time and the ordinate indicates increasing value of the illustrated signal. The plots in a section 229 of FIG. 2 illustrate simplified representations of the signals for a portion of a transmission phase and the plots in a section 230 illustrate simplified representations of the signals for a portion of an active damping phase. During the transmission phase, voltage 18 and plot 226 illustrate the drive signal applied to transducer 12. As will be seen further hereinafter, during the damping phase, voltage 18 and plot 226 represents the damping voltage formed across terminals 17 and 19 as a result of the active damping signal applied to transducer 12. This description has references to FIG. 1 and FIG. 2.

During the reverberations, voltage 26 may be substantially ninety degrees out of phase with current 25. For example, if current 25 is at a zero crossing value, then voltage 26 may be substantially at a peak value either a peak positive value or peak negative value. Referring to FIG. 2 for example, at a time to, current 25 is crossing the zero value and heading toward a positive value, and voltage 26 is at substantially a positive peak value. In some embodiments, the polarity of voltage 26 changes with the different directions of current 25. For example, between times t0 to t2, current 25 has a positive value and is flowing in the direction of the arrow in FIG. 1, causing voltage 26 to decease in value from the positive peak value to a negative peak value at time t2 where current 25 again reaches substantially the zero value. If current 25 is increasing from zero to a positive peak value and back to zero such as between times t0 to t2, voltage 26 is decreasing in value, such as for example from a positive peak value.

An embodiment of controller 203 may be configured to reduce the time interval during which transducer 12 reverberates, such as for example reduce the reverberation time interval. In one embodiment, controller 203 may be configured to form the damping signal and apply the damping signal to transducer 12 during at least a portion of the active damping phase to reduce the energy stored in transducer 12. Controller 203 is configured to form a damping signal that results in forming a damping voltage between terminals 17 and 19. It is believed that forming the damping voltage having substantially a square waveshape and a polarity that is substantially opposite to the polarity of current 25 is the most effective in dissipating the stored energy. In an embodiment, the terminology "having a polarity that is substantially opposite to the polarity of current 25" means that during the portion of the cycle that current 25 has a positive polarity (or alternately negative polarity) the damping voltage would have a negative polarity (or alternately positive polarity) for all of the cycle or the portion of the cycle that the damping voltage is applied. However, a damping signal that forms a damping voltage having other waveshapes may also be used such as a triangular waveshape (as illustrated by a dashed line 228 in plot 226) or sine wave or other waveshape. It is believed that such a phase relationship results in applying the damping voltage such that transitions of the damping voltage that change from one polarity to another polarity, such as from a negative polarity to a positive polarity, occur substantially at the peak value of voltage 26. For example as illustrated at a time t0, the damping voltage transitions from a positive to a negative value and occurs at substantially a peak positive value of voltage 26, and at a time t2 the damping voltage transitions from a negative to a positive value and occurs at substantially a peak negative value of voltage 26. It is believed that such a relationship results in quickly reducing the stored energy, thus, reducing the time that transducer 12 reverberates as illustrated by the decreasing peak value of current 25 between times t0 to t3.

In some embodiments, the damping signal may be a voltage that forms the damping voltage, in other embodiments, the damping signal may be a charge, or may be a current that results in forming the damping voltage. Configuring controller 203 to form the damping signal that forms such a damping voltage will result in being dissipated some of the energy stored in transducer 12 and reducing the reverberation time interval.

An embodiment of a reverberation cycle may include two half cycles of current 25. Each half cycle may be formed as the portion of the time interval between one substantially zero crossing of current 25 and the next substantially zero crossing of current 25. For example, plot 225 of FIG. 2 illustrates two successive half cycles or half periods 81 and 82 that form a reverberation period or cycle 80.

An embodiment of controller 203 may be configured to apply the damping signal as a first damping signal in an open-loop control configuration during the open-loop damping phase, and to apply a second damping signal in a closed-loop control configuration during the closed-loop damping phase. In some embodiments, the first damping signal may be a first voltage and the second damping signal may be a second voltage. In some embodiments, the value of the first voltage may be fixed and the value of the second voltage may vary in response to a variation in the value of current 25. An embodiment may include that the first damping signal may be a first charge and that the second damping signal may be a second charge. In some embodiments the first charge may be a fixed charge and the second charge may be a variable charge that varies in response to a variation of either the value of current 25 or the stored energy remaining in transducer 12. Controller 203 may include an embodiment that may be configured to apply the first damping signal in the open-loop control configuration during at least the open-loop damping phase, and to connect passive damping circuit 218 to transducer 12 after the peak value of current 25 has reduced to less than a first threshold value. For example, controller 203 may be configured to enable switch 219 to connect circuit 218 to transducer 12 for the passive damping phase. In other embodiments, controller 203 may be configured to apply the second damping signal in the closed-loop control configuration during the closed-loop damping phase after the peak value of current 25 has reduced to less than the first threshold value. The passive damping phase may be applied after the closed-loop damping phase. Other embodiments may include omitting the open-loop damping phase and using the closed-loop phase followed by the passive phase.

Those skilled in the art will appreciate that the peak value of current 25, or alternately the peak value of voltage 11, may be representative of the stored energy remaining in transducer 12.

During the active damping phase, the application of the damping signal may cause a change in the reverberation frequency and/or phase. Consequently, controller 203 may be configured to measure at least a portion of some state-space parameters of transducer 12 prior to and/or during the active damping phase in order to measure such parameters of transducer 12 and determine the phase and/or amplitude of the damping signal. In a non-limiting example, controller 203 may be configured to measure one or more of the reverberation frequency, the value and polarity of current 25 or a signal that is representative thereof, and/or the value and polarity of voltage 11 or a signal that is representative thereof to assist in determining one or more of the appropriate shape, polarity, frequency, period, and peak value of the active damping signal that controller 203 should apply to transducer 12. In some embodiments, current 29 may be representative of current 25 and voltage 18 may be representative of voltage 11. For example, for some of the time intervals that transducer 12 is not driven with a drive signal or a damping signal, voltage 18 may be representative of voltage 11. In some embodiments, controller 203 may be configured to measure some of the state-space parameters for every reverberation cycle and to measure other state-space parameters for only a few of the reverberation cycles. An embodiment of controller 203 may be configured to measure the reverberation frequency of transducer 12 prior to applying the first damping signal but to determine each zero crossing of current 25 for every reverberation cycle, or alternately to determine each zero crossing of current 25 and the amplitude of current 25 or voltage 11 for each reverberation cycle. Those skilled in the art will appreciate that in some embodiments active damping circuit 213 or alternately controller 205 may be configured to measure and determine the value of some of the state-space parameters instead of or in addition to controller 203.

Active damping circuit 213 may include a damping detector circuit or detector 217 that is configured to receive signals from transducer 12 and form signals on an output of detector 217 that are representative of some of the state-space parameters of transducer 12. For example, detector 217 may form a detect signal that is representative of voltage 11 or current 25 and controller 203 may use the detect signal to control the parameters of the damping signal. In some embodiments, current 29 may be representative of current 25 and voltage 18 may be representative of voltage 11. Circuit 217 may include an embodiment that is configured to measure the amplitude of voltage 18 and to detect a zero crossing of the value of voltage 18. Alternately, detector 217 may be configured to form a detect signal that is representative of current 25 and controller 203 may use the detect signal to control the parameters of the damping signal. In an embodiment, circuit 213 or alternately controller 203 or controller 205 may include an embodiment that may be configured to determine the frequency and/or phase of current 25 from the time interval between zero crossings of voltage 18 and to form the damping signal with a frequency that is substantially the same as the frequency of current 25. An embodiment of circuit 213 or alternately controller 203 or controller 205 may include an embodiment that may be configured to determine the amplitude of current 25 from the amplitude of voltage 18 and to form a damping signal with an amplitude that changes proportionally to changes in the amplitude of current 25. Active damping circuit 213 may also include a damping driver circuit or damping driver 216 that may be used to apply the damping signal to transducer 12. In some embodiments, damping driver 216 may also be configured to form the drive signal or a portion thereof for driving transducer 12 during the transmission phase.

Figure 3:
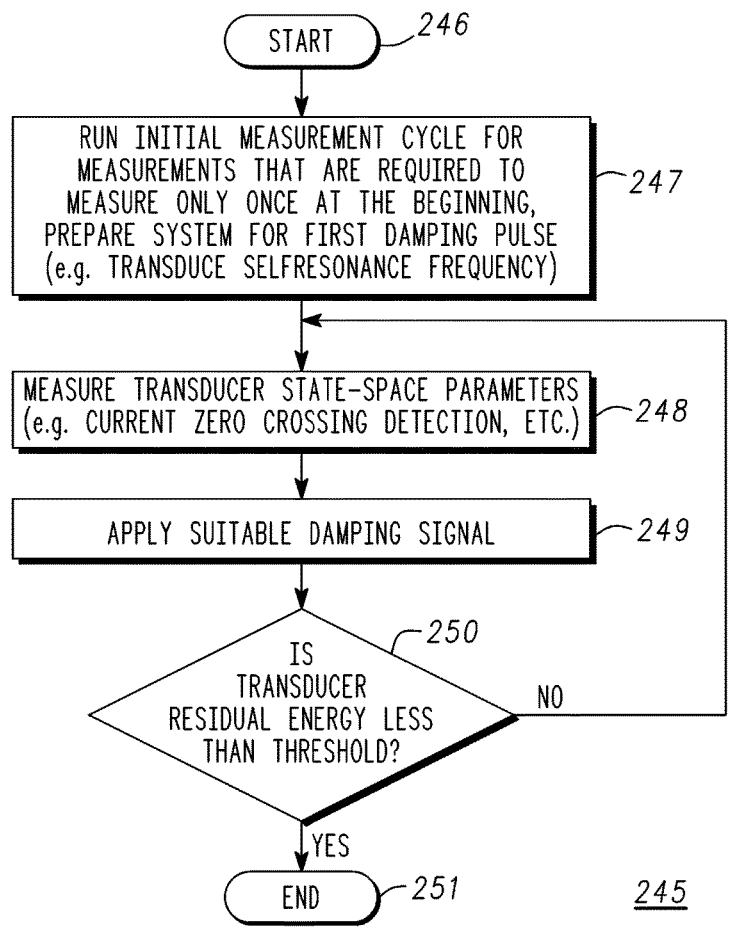
FIG. 3 illustrates a generalized flowchart illustrating in a general manner a non-limiting example embodiment of some of the operations formed by the acoustic transducer controller of FIG. 1 during an example of at least a portion of a damping phase in accordance with the present invention.

FIG. 3 includes a generalized flowchart illustrating in a general manner a non-limiting example embodiment of some of the operations that may be formed by controller 203 during an example of an active damping phase.

At a step 246, controller 203 has terminated the drive signal for driving transducer 12 during the transmission phase. At a step 247, controller 203 measures at least some of the state-space parameters of transducer 12 to determine, among other things, the reverberation frequency of transducer 12.

At a step 248, controller 203 may be configured to measure other state-space parameters. For example, controller 203 may be configured to determine the amplitude of current 25. Controller 203 include an embodiment that may be configured to determine each zero crossing of current 25 in order to determine the reverberation frequency and the timing for applying the damping signal so that the zero crossings of the damping voltage are substantially the same as the zero crossings of current 25 with the damping voltage having a polarity that is substantially opposite to the polarity of current 25. In some embodiments controller 203 may also be configured to determine the amplitude of current 25 in order to form an amplitude of the damping signal to be proportional to the amplitude of current 25. At a step 249, controller 203 may be configured to apply the damping signal having the parameters such as those previously described.

After applying the damping signal, controller 203 may be configured to determine if the energy stored in transducer 12 has decreased to a value that is below a threshold value. An embodiment may include that the amplitude of voltage 18 or current 29 may be representative of the stored energy, in other embodiments, the stored energy may be represented by an amount that the reverberation frequency has changed. If the energy is still greater than the threshold value, controller 203 returns to step 248 to continue the active damping phase. If the energy is less than the threshold, controller 203 may exit and proceed to the next phase. In some embodiments, the next phase may be a passive damping phase where controller 203 may disable switch 214 and enable switch 219 to connect passive damping circuit 218 to transducer 12 to continue reducing the stored energy. In some embodiments, applying the damping signal may change the frequency, thus the period, of the reverberation signal. Thus, the method may include that controller 203 may configured to measure at least the frequency and/or phase of the reverberation signal after applying one damping signal and before applying another damping signal as illustrated by the flow chart returning to step 247. Other embodiments may omit the additional measuring step.

Figure 4:
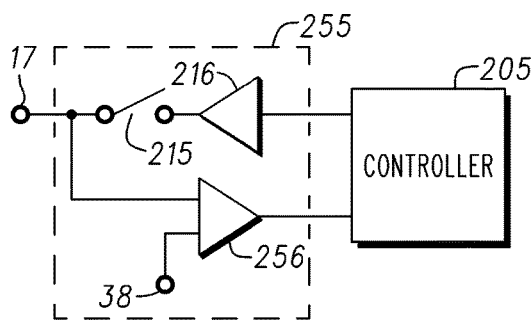
FIG. 4 schematically illustrates an example of an embodiment of a portion of an active damping circuit that may have an embodiment that may be an alternate embodiment of at least a portion of the acoustic transducer controller of FIG. 1 in accordance with the present invention.

FIG. 4 schematically illustrates an example of an embodiment of a portion of an active damping circuit 255 that may have an embodiment that may be an alternate embodiment of at least a portion of circuit 213 of FIG. 1. Circuit 255 may be substantially the same as and function similarly to at least some embodiments of circuit 213. Circuit 255 includes a damping detector circuit or damping detector 256 that is configured to receive a signal that is representative of voltage 18 and detect zero crossings of the value of the voltage 18. In some embodiments, circuit 256 may be configured as a zero crossing detector circuit. An embodiment of circuit 255 may also include circuit 217. Controller 205, or alternately controller 203, may be configured to detect two or more successive zero crossings of voltage 18 and interpolate between the zero crossings to determine the time at which current 25 will have a zero crossing. Referring to FIG. 2, one skilled in the art would understand that a zero crossing of current 25 occurs substantially halfway between two successive crossings of voltage 18. Those skilled in the art will appreciate that even if the reverberation frequency is decreasing the midpoint between two successive crossings of voltage 18 would substantially approximate the time free zero crossing of current 25. In an embodiment, detector 256 may be a comparator having a non-inverting input connected to receive a signal representative of voltage 18 and an inverting input connected to receive the common reference voltage. For such an embodiment, the output of the comparator would change state at each zero crossing of voltage 18.

Figure 5:
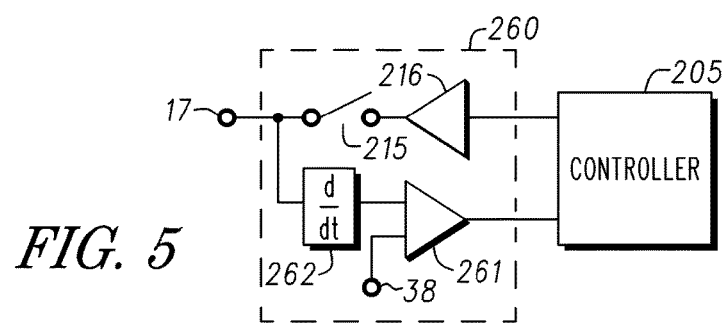
FIG. 5 schematically illustrates an example of an embodiment of a portion of another active damping circuit that may have an embodiment that may be an alternate embodiment of the active damping circuit of FIG. 4 or alternately at least a portion of the acoustic transducer controller of FIG. 1 in accordance with the present invention.

FIG. 5 schematically illustrates an example of an embodiment of a portion of an active damping circuit 260 that may have an embodiment that may be an alternate embodiment of at least a portion of circuit 213 or of circuit 255. Circuit 260 includes a damping detector circuit that may include a differentiator circuit 262 and a zero crossing detector circuit 261. Differentiator circuit 262 may be configured to receive a signal that is representative of voltage 18 and differentiate the signal to form a signal that is substantially in phase with current 25. Circuit 261 may be configured to detect the zero crossings of the signal received from circuit 262. In one embodiment, circuit 261 may be a comparator, or alternately a hysteresis comparator, that is configured to detect the zero crossings of the signal from circuit 262, thus zero crossings that are representative of the zero crossings of current 25. For such an embodiment, the output of circuit 261 would change states responsively to the zero crossings that are representative of the zero crossings of current 25. An embodiment of the comparator of circuit 261 may have a non-inverting input connected to the output of circuit 262, and an inverting input connected to the common reference voltage. An input of circuit 262 may be configured to be connected to terminal 17 of transducer 12. An embodiment of circuit 260 may also include circuit 217.

Figure 6:
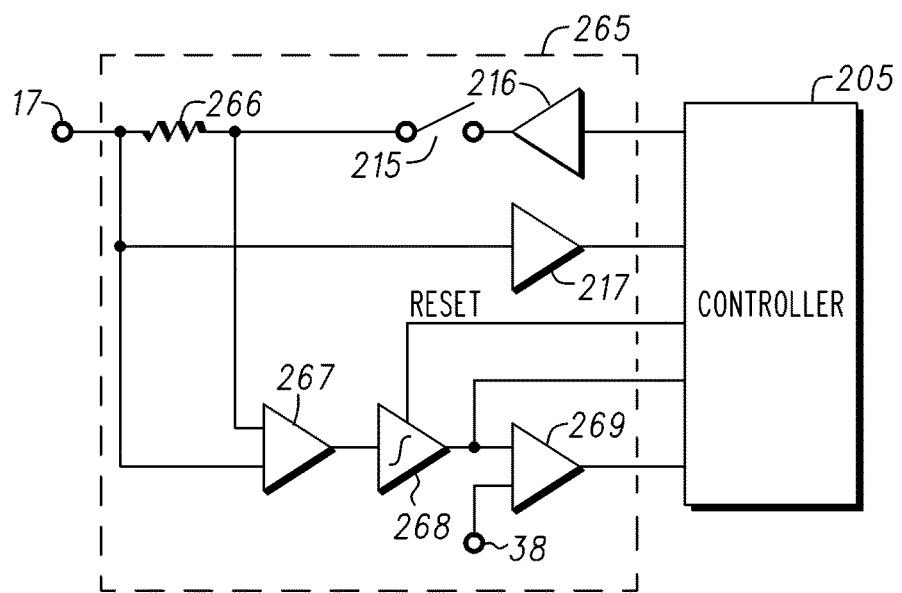
FIG. 6 schematically illustrates an example of an embodiment of a portion of another active damping circuit that may have an embodiment that may be an alternate embodiment of the active damping circuit of FIG. 4 or 5 or alternately at least a portion of the acoustic transducer controller of FIG. 1 in accordance with the present invention.

FIG. 6 schematically illustrates an example of an embodiment of a portion of an active damping circuit 265 that may have an embodiment that may be an alternate embodiment of at least a portion of any of circuits 213, 255, or 260. Circuit 265 may be configured to receive a signal that is representative of current 25 and to detect zero crossings of current 25. An embodiment of circuit 265 may include a current sensor circuit 266 that is configured to form a signal that is representative of current 25. In an embodiment, circuit 266 may be an in-line series resistor through which a signal that is representative of current 25 flows such that the resistor forms a voltage that is representative of current 25. In other embodiments, circuit 266 may have other configurations. For example, circuit 266 may be configured as a low impedance buffer such that a current received on the input of the buffer forms a current through the buffer that is representative of current 25. One example of such a buffer is explained hereinafter in the description of FIG. 12. Circuit 266 may have other implementations in other embodiments. Circuit 265 may also include an amplifier 267 that receives the signal formed by circuit 266 and forms a voltage that is representative of current 25.

An integrator 268 is configured to integrate the signal from amplifier 267 and form a signal that is representative of voltage 11. Integrator 268 may be used to assist in filtering some of the higher harmonics of the signal from transducer 12 to provide a more reliable operation. Circuit 265 also includes a zero crossing detector, such as for example a comparator 269, that is configured to change the state of the comparator output signal for each zero crossing of the output of integrator 268.) In some embodiments, circuit 265 may also include circuit 217.

Figure 7:
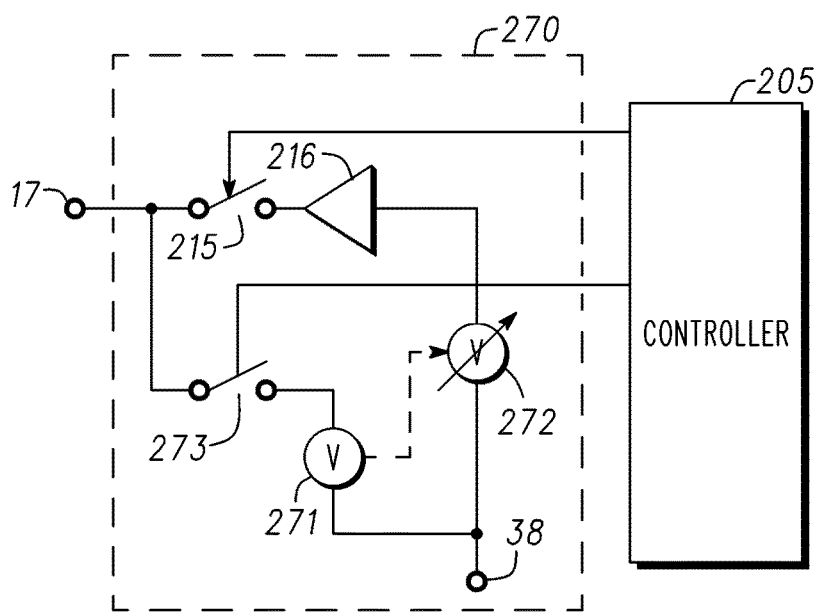
FIG. 7 schematically illustrates an example of an embodiment of a portion of another active damping circuit that may have an embodiment that may be an alternate embodiment of at least a portion of the acoustic transducer controller of FIG. 1 in accordance with the present invention.

FIG. 7 schematically illustrates an example of an embodiment of a portion of an active damping circuit 270 that may have an embodiment that may be an alternate embodiment of at least a portion of circuit 213 (FIG. 1). An embodiment of circuit 270 may be configured to determine an amplitude of current 25 and apply a damping signal having an amplitude that is proportional to the amplitude of current 25. Some embodiments of circuit 270 may be used in the closed-loop phase. An embodiment of circuit 270 may include a voltage detection circuit 271 and an adjustable voltage source 272. An embodiment of circuit 271 may be configured to monitor the value of voltage 18 and form a control signal that is used to adjust the value of the voltage formed by source 272 in response to the value of voltage 18. In an embodiment, circuit 271 may be configured to adjust the value of the voltage formed by source 272 in response to the value of voltage 18. Driver 216 receives the voltage from source 272 and forms the damping signal to have an amplitude that is proportional to the amplitude of voltage 18. For example, circuit 271 may be formed as an amplifier that receives the signal from transducer 12, such as from terminal 17, that is representative of voltage 18 and forms the control signal to have a value that changes as the value of voltage 18 changes. An embodiment may include that circuit 271 may form the control signal to have a value that is representative of a peak value, or alternately an average value or average rectified value, of voltage 18 which may be representative of, such as for example proportional to, the value of current 25. In response, driver 216 may form the damping signal to have a peak value, or alternately average value, that is proportional to the corresponding value of current 25. Circuit 270 may also be configured to couple circuit 271 to receive the signal that is representative of voltage 18 for at least a portion of a reverberation cycle or alternatively receive the signal for a portion of one or more reverberation cycles. For example, circuit 270 may include a switch 273 that may be configured to couple circuit 270 to receive the signal for the portion of the cycle. An embodiment of circuit 270 may also include circuit 217. Those skilled in the art will appreciate that circuit 270 may be used as a portion of circuit 213 or any of circuits 255, 260, or 265.

Figure 8:
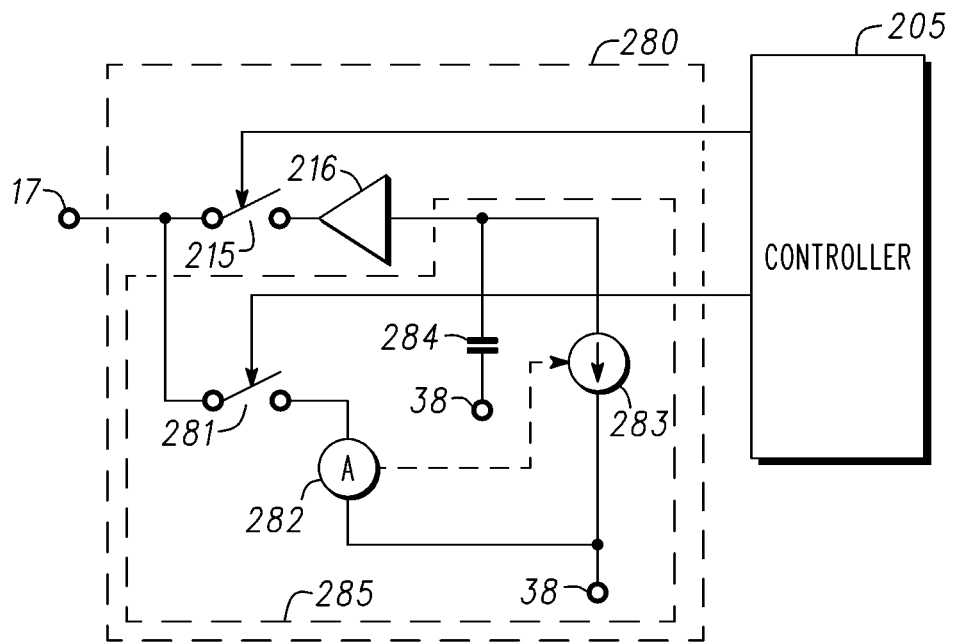
FIG. 8 schematically illustrates an example of an embodiment of a portion of an active damping circuit that may have an embodiment that may be an alternate embodiment of the active damping circuit of FIG. 7 or alternately at least a portion of the acoustic transducer controller of FIG. 1 in accordance with the present invention.

FIG. 8 schematically illustrates an example of an embodiment of a portion of an active damping circuit 280 that may have an embodiment that may be an alternate embodiment of circuit 213 or circuit 270. Circuit 280 includes a current monitoring circuit 282 and a variable current source 283 that adjusts the value of the current formed by source 283 in response to a control signal received from circuit 282. Circuit 282 may be configured to receive a signal that is representative of current 25, such as for example current 29, and form the control signal to have a value that varies in proportion to the value of current 25 such that the value of current form by source 283 is proportional to the value of current 25. For example, an embodiment of circuit 280 may be configured to form the value of the current from source 283 to be proportional to the peak value, or alternatively the average value or the average rectified value, of current 25. The current from source 283 forms a voltage on capacitor 284 that is proportional to the value of current 25. Driver 216 uses the value of the voltage from capacitor 284 to form the amplitude of the drive signal to be proportional to the value of current 25, and that has a period that is substantially the same as the period of current 25. An embodiment of circuit 282 may be formed similarly to circuit 266 (FIG. 6) or alternately to circuit 266 and amplifier 267. Circuit 280 may also be configured to couple circuit 282 to receive the signal that is representative of current 25 from transducer 12 for at least a portion of a reverberation cycle or alternatively receive the signal for a portion of one or more reverberation cycles. Those skilled in the art will appreciate that circuit 280 may be used as a portion of circuit 213 or any of circuits 255, 260, or 265.

Figure 9:
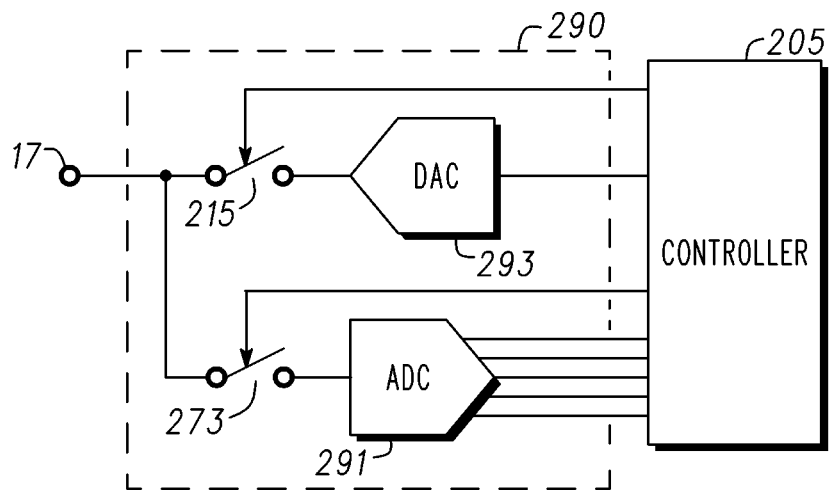
FIG. 9 schematically illustrates an example of an embodiment of a portion of another active damping circuit that may have an embodiment that may be an alternate embodiment of the active damping circuit of FIG. 7 or 8 or alternately at least a portion of the acoustic transducer controller of FIG. 1 in accordance with the present invention.

FIG. 9 schematically illustrates an example of an embodiment of a portion of an active damping circuit 290 that may have an embodiment that may be an alternate embodiment of circuit 213 or any of circuits 270, or 280. Circuit 290 includes an analog-to-digital converter circuit or ADC 291 and a digital-to-analog converter circuit or DAC 293. Circuit 291 may be configured to receive voltage 18 or a signal that is representative thereof or alternately receive current 25 or a signal that is representative thereof, and convert the signal to a digital value and provide information representative of the signal to controller 205. Controller 205 may use the digital information to determine the amplitude of the drive signal to apply to transducer 12. Controller 205 may also use the digital signals received from circuit 291 to determine the zero crossing of current 25 as explained hereinbefore. In some embodiments the output of circuit 293 may be used to form the amplitude of the drive signal to be representative of the value of current 25. For example, the output of circuit 293 may be used as an input to circuit 216 to control the amplitude of the output of circuit 216.

Figure 10:
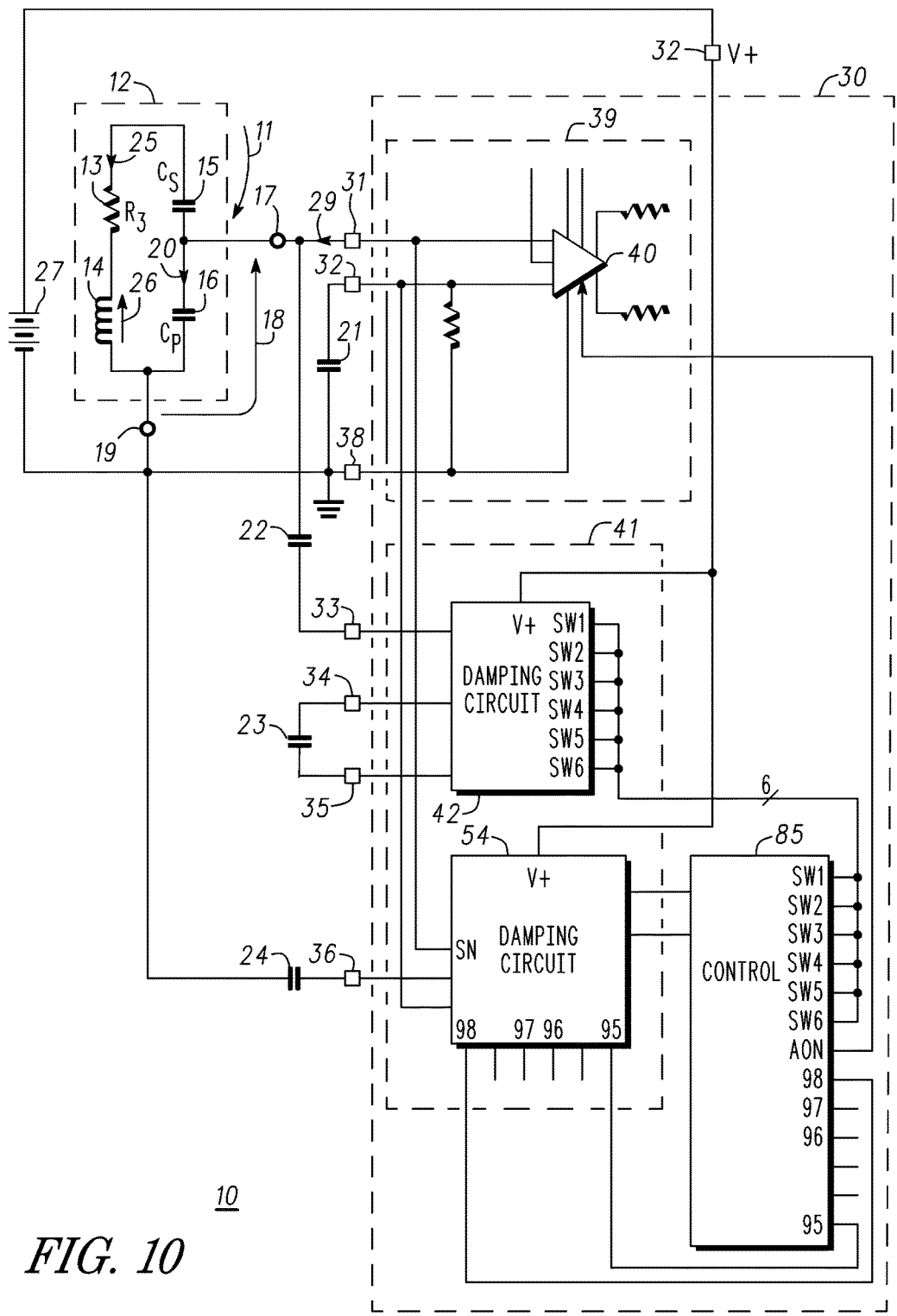
FIG. 10 schematically illustrates example of an embodiment of a portion of an acoustic system that includes an acoustic transducer controller that may be an alternate embodiment of the acoustic transducer controller of FIG. 1 in accordance with the present invention.

FIG. 10 schematically illustrates example of an embodiment of a portion of an acoustic system 10 that includes an acoustic transducer controller 30. Controller 30 may have embodiments that may be an alternate embodiment of controller 203 that was explained in the description of FIGS. 1-3.

An embodiment of controller 30 may include a receiver circuit or receiver 39, an active damping circuit 41, and a controller circuit or controller 85. In some embodiments, controller 30 may also include a passive damping circuit (not shown) such as circuit 218 illustrated in FIG. 1. Receiver 39 may have an embodiment that may be an alternate embodiment of receiver circuit 210 explained in the description of FIG. 1. Controller 85 may be an alternate embodiment of controller 205 of FIG. 1. Active damping circuit 41 may include an open-loop damping circuit 42 and a closed-loop damping circuit 54. Some embodiments of open-loop damping circuit 42 may be an alternate embodiment of at least a portion of active damping circuit 213 or alternately at least a portion of circuit 216 illustrated in FIG. 1 or may include embodiments of any of circuits 255, 260, or 265 of respective FIGS. 4-6. In some embodiments, open-loop damping circuit 42, or portions thereof, may also be used to form the drive signal to drive transducer 12 during the transmission phase. Thus, an embodiment of circuit 42, or portions thereof, may be an alternate embodiment of Tx circuit 207 illustrated in FIG. 1. In some embodiments, closed-loop damping circuit 54 may also be an alternate embodiment of at least a portion of circuit 213. Closed-loop damping circuit 54 may have embodiments that may include an alternate embodiment of circuit 217 (FIG. 1), or of circuits 270, 280, or 290 illustrated in respective FIGS. 7-9. Circuit 42 may include an output 51 that may be configured to provide the drive signal to transducer 12. For example, output 51 may be coupled to an output 33 of controller 30. System 10 may include an optional decoupling capacitor 22 connected in series between output 33 and terminal 17 of transducer 12.

In an embodiment, controller 30 may include an input 31 that may be configured to be coupled to transducer 12 in order to receive an electrical signal from transducer 12. Receiver circuit 39 may include, in an embodiment, a receiver amplifier 40 in addition to other circuitry (not shown) that is configured to receive the electrical signal from transducer 12. Receiver circuit 39 may also include other circuitry to assist in utilizing the received signal to perform a distance measuring operation. An embodiment of controller 30 may also include an input 32 that, in some embodiments, may be coupled to another input of amplifier 40.

Controller 85 may be configured to receive various operational signals of controller 30 and to form control signals to control the operation of controller 30. In an embodiment, controller 85 may be configured to form control signals to control the operation of the transmission phase, the damping phase, and the distance measuring phase.

Controller 30 may also have an embodiment that may include inputs 34 and 35 which may be configured to be coupled to an open-loop damping capacitor 23 to assist in the open-loop damping phase. In some embodiments capacitor 23 may also be utilized during the transmission phase. In other embodiments, capacitor 23 may be internal to controller 30 or may be omitted. An input 36 of an embodiment of circuit 30 may be configured to be coupled to a closed-loop damping capacitor 24 that may be utilized to assist in the closed-loop damping phase. In other embodiments, capacitor 24 may be internal to controller 30 or may be omitted. An embodiment may include that capacitor 22 may be omitted and output 51 of circuit 42 may be connected to input 31 of circuit 30.

Figure 11:
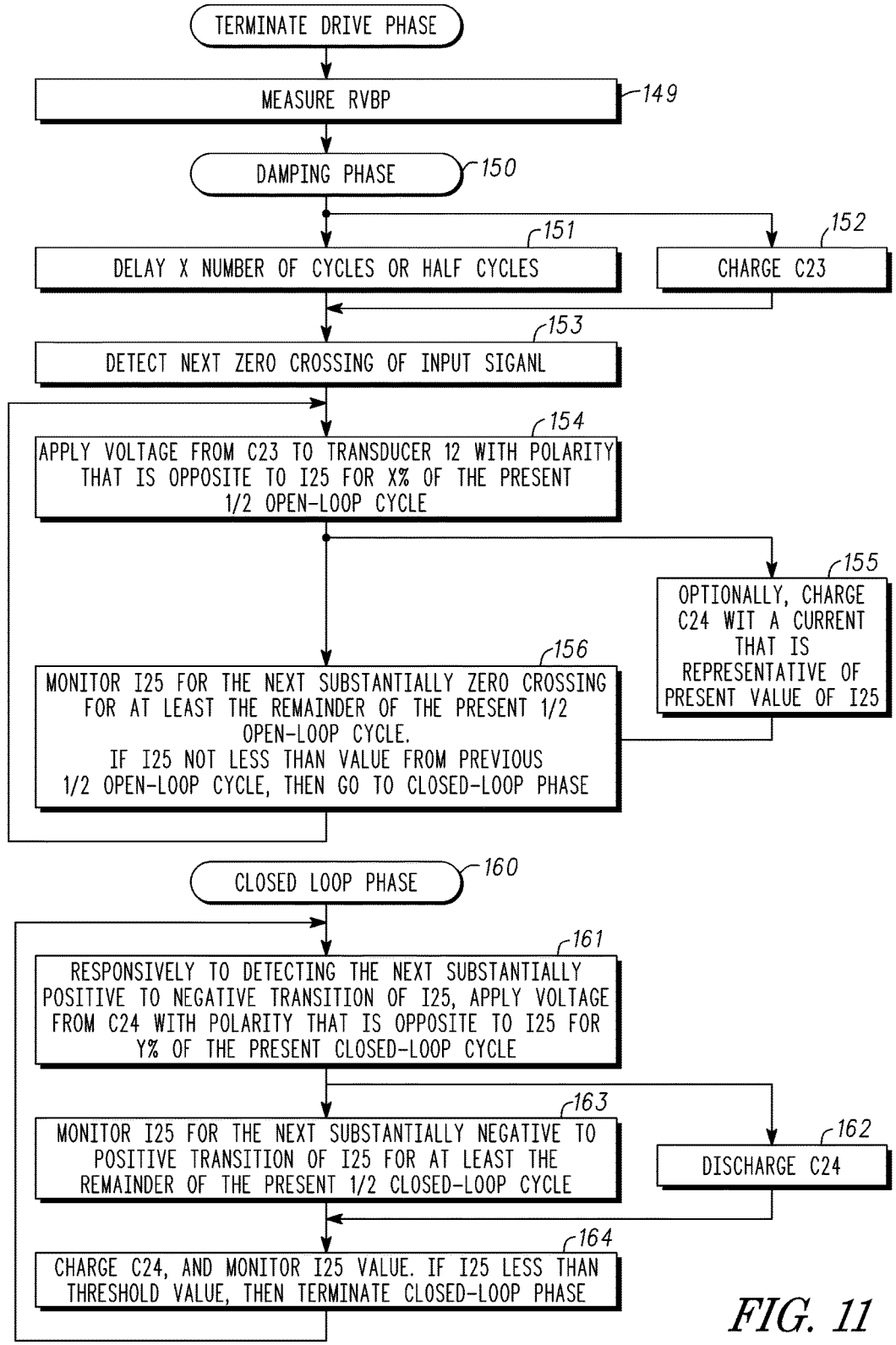
FIG. 11 is a generalized flowchart that illustrates in a general manner some of the operations formed by the controller of FIG. 1 or FIG. 10 during an example of an embodiment of an open-loop sub-phase method and an example of an embodiment of a closed-loop sub-phase method in accordance with the present invention.

FIG. 11 is a generalized flowchart that illustrates in a general manner some of the operations formed by controller 30 during an example of an embodiment of a method for the open-loop phase and an example of an embodiment of a method for the closed-loop phase. This description has references to FIG. 10 and FIG. 11.

Controller 30 or may include an embodiment that, prior to starting the damping phase, is configured to terminate the transmission phase. In some embodiments, terminating the transmission phase may include that the drivers of the driver circuit are disabled. In an embodiment, the output of the drivers may be placed in a high impedance state, in other embodiments the output transistors of the drivers may all be disabled. Since the reverberation frequency may be affected by various factors, controller 30 is configured to measure the reverberation frequency of transducer 12 to determine the present reverberation frequency as illustrated at a step 149. In some embodiments, the reverberation frequency measurement operation may be a part of the damping phase, such as for example prior step 151 or may be performed during step 151 or may alternately be included as a part of step 154 such that the reverberation frequency may be measured for (or alternately after) each application of the damping signal.

In an embodiment, controller 30 may be configured to pre-charge capacitor 23 to a first voltage value prior to applying the first cycle of a damping voltage. For example, controller 30 may be configured to pre-charge capacitor 23 after terminating the drive signal. Another embodiment of controller 30 may be configured to pre-charge capacitor 23 during the transmitting phase. In some embodiments, capacitor 23 may be pre-charged as illustrated at step 152. In an embodiment, the first voltage value may be approximately equal to the input voltage (V+). Controller 30 may include embodiments that may use multiple voltage levels for pre-charging capacitor 23. For example, the first voltage may be approximately equal to voltage 26 or may be greater than voltage 26 or may a lower value that may be proportional to voltage 26. In an embodiment, controller 30 may pre-charge capacitor 23 so that the first voltage will be much smaller than the value of voltage 26. The first voltage may have other values in other embodiments as long as the value is large enough to dissipate some of the energy stored in transducer 12.

Steps 151-156 illustrate a non-limiting example of some steps of an embodiment of an open-loop phase method and steps 160-164 illustrate a non-limiting example of some steps of an embodiment of a closed-loop phase method.

In one embodiment, controller 30 may be configured to delay a number of open-loop cycles or half open-loop cycles after terminating the drive signal and prior to applying the damping voltage to transducer 12. An embodiment may include that controller 30 may be configured to delay a number of periods or half periods of current 25, such as for example half cycles of the reverberation frequency, after terminating the drive signal and prior to applying the damping voltage as illustrated by step 151. In an embodiment, capacitor 23 may be pre-charged during this delay or optionally may be pre-charged prior to step 151. Controller 30 may also be configured to measure some of the state-space parameters of transducer 12 during the delay time.

In an embodiment, controller 30 may be configured to form the open-loop phase to have an open-loop cycle having an open-loop cycle time that may be substantially similar to the reverberation cycle time that was determined from the measurement operation of step 149. In some embodiments, controller 30 may be configured to form the open-loop cycle time substantially equal to the cycle time of current 25 or alternately to a cycle time of the driving signal. The open-loop damping method may include an optional step (not shown) for measuring the reverberation frequency to determine the present reverberation frequency, such as for example after step 153 and prior to or as a portion of step 154.

Controller 30 may include an embodiment that may be configured to detect a substantially zero crossing of current 25 and to responsively determine the polarity of current 25, such as illustrated by step 153 for example. In an embodiment, controller 30 may be configured to determine the polarity of voltage 18 and use the determined polarity of voltage 18 to calculate a polarity for current 25.

As illustrated at step 154, in response to the zero crossing of current 25, controller 30 may be configured to apply the voltage from capacitor 23 between terminals 17 and 19 of transducer 12 such that the voltage on capacitor 23 is applied with a polarity that is opposite to the polarity of current 25. Alternately, controller 30 may be configured to apply the damping voltage with a polarity that is shifted to the phase of voltage 26 such that a negative-to-positive transition of the damping voltage substantially aligns with a peak negative value of voltage 26 and such that a positive-to-negative transition of the damping voltage substantially aligns with a positive peak value of voltage 26. As used herein, the term "substantially aligns" or "substantially aligned" means that the two values of the two signals may be offset from each other by up to plus or minus approximately twenty to approximately thirty degrees of each other. In some embodiments, the input voltage (V+) may be connected in series with capacitor 23 to apply a damping voltage that is greater than the voltage on capacitor 23. In some embodiments, circuit 30 may be configured to apply the damping voltage for a percentage (X %) of a half of an open-loop cycle or in another embodiment the percentage of a half of a period of current 25. In one non-limiting example embodiment, circuit 30 may be configured to apply the damping voltage for approximately eighty percent (80%) of a half of the open-loop cycle or in an alternate embodiment 80% of a half of a period of current 25. The dashed lines in FIG. 2 illustrate example embodiments of the portion of the cycle that transducer 12 is not driven by the damping signal. The remainder of the half of the open-loop cycle (or in an alternate embodiment a half of a period of current 25), such as for example twenty percent (20%) of the half of the open-loop cycle, controller 30 may be configured to monitor the value and polarity of current 25. If the value of current 25 for the present half of the open-loop cycle (or in an alternate embodiment the present half of the period of current 25) is substantially no less than the value from a previous half of an open-loop cycle, controller 30 may be configured to terminate the open-loop sub-phase and proceed to the next operation. If the value of current 25 is less than the value during a previous half of an open-loop cycle (or in an alternate embodiment a previous half of a period of current 25), controller 30 may be configured to continue the open-loop sub-phase. Thus, in some embodiments if the value of current 25 is not decreasing, it is assumed that the value is not decreasing and that too much energy may have transferred to the transducer. Additionally, some embodiments of controller 30 may be configured to stop or terminate the open-loop damping phase if two successive transitions of current 25 zero crossing of current 25 indicate a change in frequency for more than a threshold percent of the frequency. For example the threshold percent may be a change of greater than twenty percent (20%) or more. One skilled in the art will understand that other types of conditions might be used for stopping the open-loop damping phase.

During the remainder of the half of the open-loop cycle (or in an alternate embodiment the remainder of the half of the period of current 25), controller 30 may be configured to monitor current 25 for a substantially next zero crossing of current 25. Upon detecting the next zero crossing, control returns to step 154.

In an embodiment, capacitor 23 may not re-charged during for any of the subsequent steps of the open-loop method. This may allow controller 30 to slowly decrease the value or amplitude of the damping signal. Controller 30 may have embodiments that may be configured to apply a fixed amount of charge or alternately a fixed value of voltage to transducer 12. The fixed charge or alternately fixed value of voltage facilitates quickly dissipating a majority of the energy stored in transducer 12. In other embodiments, capacitor 23 may be re-charged during one of the open-loop steps such as a portion of step 156, for example during the remainder of the open-loop cycle. In some embodiments, controller 30 may be configured to terminate the open-loop phase in response to the peak value of current 25 having a value less than a certain threshold value. In other embodiments, controller 30 may be configured to terminate the open-loop phase in response to the reverberation frequency of current 25 changing by a certain threshold amount. For example, controller 30 may be configured to terminate the open-loop phase in response to the reverberation frequency having a value that is less than or that is greater than the certain threshold frequency or in another embodiment in response to the reverberation frequency of current 25 decreasing or alternately increasing by a certain percent, for example decreases or increases by approximately twenty percent (20%) or greater.

In some embodiments capacitor 23 may be replaced by a voltage source, either internal or external to controller 30.

Controller 30 may optionally be configured to proceed to the closed-loop phase after terminating the open-loop phase. In other embodiments, controller 30 may terminate the open-loop phase and may not proceed to the closed-loop phase but may proceed to a passive damping phase or may alternately proceed to the measurement phase.

An embodiment of controller 30 may be configured to begin the closed-loop phase responsively to terminating the open-loop phase. One non-limiting example embodiment of some steps of a closed-loop cycle is illustrated by steps 160-163 of FIG. 11.

An embodiment of controller 30 may be configured to pre-charge capacitor 24 prior to step 160 so that capacitor 24 may be prepared to for use in response to beginning the closed-loop phase. For example, capacitor 24 may be pre-charged by optional step 155. Controller 30 may be configured to charge capacitor 24 with a closed-loop current that is substantially proportional to current 25. In some embodiments the closed-loop current may be greater than current 25. An embodiment may include that the closed-loop current is at least eight times greater than current 25. In other embodiments, the closed-loop current may be between approximately five to approximately ten (5-10) times greater than current 25. In other embodiments, the closed-loop current may be more than ten times greater than current 25. In one non-limiting example embodiment, controller 30 may optionally be configured to charge capacitor 24 with a closed-loop current that is proportional to the remaining amount of energy stored in transducer 12.

In one embodiment, the cycle time of a closed-loop cycle may be substantially equal to the cycle time of an open-loop cycle or alternately substantially equal to a reverberation cycle. In an embodiment, a closed-loop cycle may also be formed to include to two closed-loop half cycles. Each closed-loop half of a cycle may be formed between substantially two sequential zero crossings of current 25.

In one embodiment, controller 30 may be configured to detect that current 25 changes from a positive value to a negative value as illustrated at step 161 of FIG. 11. In response to the positive-to-negative transition of current 25, controller 30 may be configured to apply the charge from capacitor 24 to transducer 12, such as illustrated at step 161. In another embodiment, controller 30 may be configured to apply the charge in response to a positive-to-negative substantially zero crossing of current 25. In response to detecting the substantially zero crossing of current 25, controller 30 may be configured to apply the voltage from capacitor 24 between terminals 17 and 19 of transducer 12 and with a polarity that is opposite to the polarity of current 25. Controller 30 may be configured to apply the voltage from capacitor 24 for a percentage of a cycle of current 25 or alternately for a percentage (Y %) of a half of a closed-loop cycle. The percentage may be the same as the percentage use for the open-loop cycle or may be a different value.

For the remainder of the half of the closed-loop cycle, controller 30 may be configured to detect that current 25 changes from a negative value to a positive value as illustrated at step 163 of FIG. 11. Controller 30 may include an embodiment that may be configured to briefly discharge capacitor 24 in order to reset the charge of capacitor 24.

AS illustrated by step 164, in response to the next substantially negative to positive transition of current 25 controller 30 may be configured to charge capacitor 24 with the closed-loop current. In another embodiment, controller 30 may be configured to charge capacitor 24 with a current that is substantially representative of the positive portion of current 25. In an embodiment, during a portion of the present closed-loop half-cycle that current 25 is positive, controller 30 may be configured to, in response to a positive value of current 25, determine if the value of current 25 is less than a threshold value (Ith) as illustrated at step 164. An embodiment may include that the threshold value may be a positive current value. If the value of current 25 is less than the threshold value, controller 30 is configured to terminate the closed-loop phase or to otherwise continue the closed-loop sub-phase (such as for example as illustrated by step 164 proceeding to step 161 of FIG. 11).

Those skilled in the art will appreciate that in one embodiment, controller 30 may be configured to apply a variable amount of charge to transducer 12 during the closed-loop phase wherein the variable amount of charge is representative of a residual energy stored in transducer 12. The variable charge facilitates dissipating the stored energy without substantially adding additional energy to transducer 12. For example, charging capacitor 24 with a current that is representative of current 25 results in charging capacitor 24 with a current that is representative of the present value of the stored energy remaining in transducer 12.

In one embodiment, controller 30 may be configured to perform a distance measuring operation in response to terminating the closed-loop sub-phase or alternately in response to terminating the damping phase. In one embodiment, the distance measuring phase may include receiving and processing electrical signals received from transducer 12 in response to the reflected acoustic waves or echoes. In one non-limiting example embodiment, signal AON of controller 85 may be configured to enable amplifier 40 after the damping phase is finished. For such an example embodiment, receiver 39 may be formed to use a current input. In such a configuration, the receiver may be switched off during damping because its input impedance is very low in the ON state. An embodiment of controller 30 may include that amplifier 40 may have a gain control (GC) that may be selectively controlled during the damping phase to form an input impedance for amplifier 40. Some embodiments of controller 30 may activate only one of circuits 41, 42, or 52. Circuits that are not activated may be placed in a high impedance mode or may be disconnected from output 33. Amplifier 41 can have either constant gain to form a low input impedance or can be configured to have a variable gain to form that may vary in a range from the transducer characteristic impedance down to a lower impedance during the first phase of the measurement phase. For example controller 30 may be configured to selectively form the input impedance of amplifier 40 to be greater than an input impedance of an SN input of circuit 54. In an embodiment, the SN input of circuit 54 may be configured to form a virtual ground to minimize the influence of capacitor 16 of transducer 12. The input impedance of circuit 39, or alternately amplifier 40, may be formed to minimize any skewing of the sensing of current 25. In another embodiment, controller 30 may be configured to selectively disconnect the input of amplifier 40 from input 31 during the damping phase. Controller 30 may also be configured to selectively control the input of amplifier 40 to have a low value during the distance measuring phase.

Figure 12:
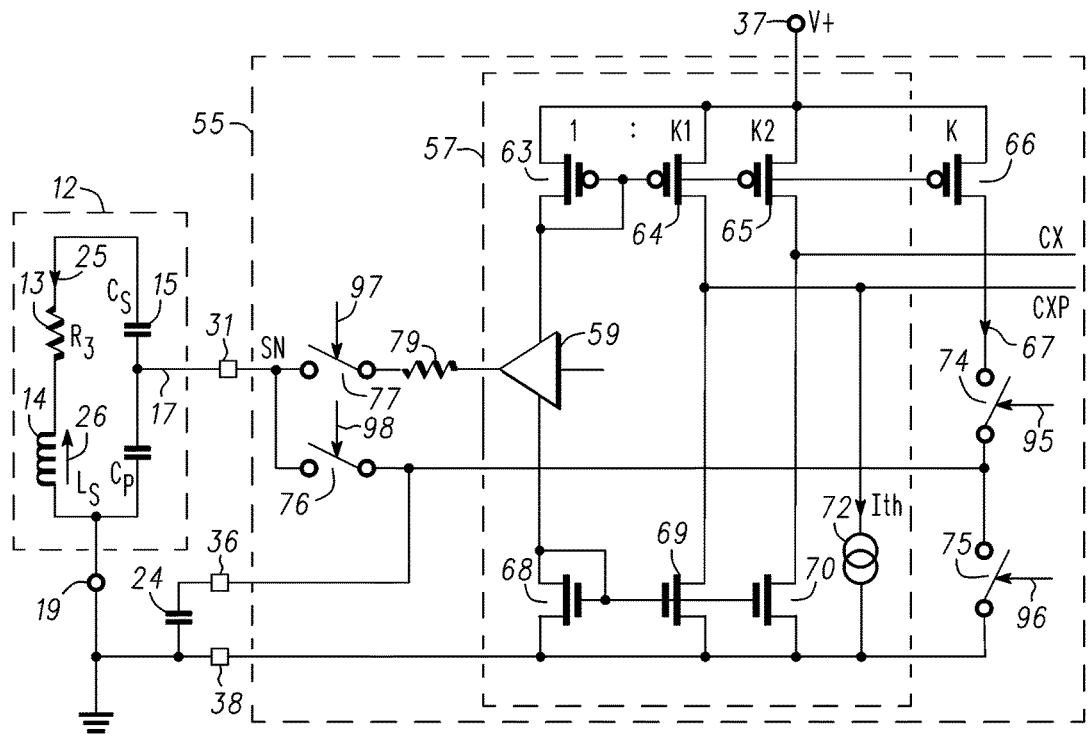
FIG. 12 schematically illustrates an example of an embodiment of a portion of a closed-loop damping circuit that may be an alternate embodiment of at least a portion of a closed-loop damping circuit of FIG. 1 or 10 in accordance with the present invention.

FIG. 12 schematically illustrates an example of an embodiment of a portion of a monitor and charge circuit 55 that may be an alternate embodiment of at least a portion of closed-loop damping circuit 54 that was described in the description of FIG. 10. Circuit 55 includes a current comparator 57 that may be configured to determine the polarity and value of current 25. Circuit 55 may also include a charging circuit that may be used to charge capacitor 24 with a closed-loop current 67 that is substantially proportional to current 25. In one embodiment, a current 67 used to charge capacitor 24 may be substantially equal to current 25 but may have other proportionality ratios in other embodiments.

Comparator 57 may include a buffer 59 that is configured to receive a current from transducer 12 that is representative of current 25 and to form a current 62 that is representative of current 25. Buffer 59 may have an output that has a low input impedance such that the current received from input 31 forms current 62 from buffer 59 through transistors 63 and 68 to be representative of current 25. For this discussion, current 25 is described as having a positive value if current 62 is flowing in a direction illustrated by the arrow in FIG. 12 and is described as having a negative value if current 62 is flowing in a direction that is opposite to the arrow illustrated in FIG. 12. A switch 77 is connected between the output of buffer 59 and input 31 and is controlled by a control signal from control circuit 85 (FIG. 10). In one embodiment, switch 77 may be enabled during the remainder of the half of the open-loop half cycle in order to monitor and determine the polarity and value of current 25 and to also form a current to charge capacitor 24 (such as illustrated by steps 155-156 of FIG. 11 for example). Switch 77 may be also enabled during the remainder of the half of the closed-loop half cycle for substantially similar functionality as illustrated by step 164 of FIG. 11, for example. In an embodiment, switch 77 may be disabled during the percentage (X %) of the half of the open-loop half cycle and the percentage (Y %) of the half of the closed-loop cycle in step 161.

In one example embodiment of comparator 57, transistor 63 may be connected in a current mirror configuration with transistors 64 and 65 and transistor 68 may be connected in a current mirror configuration with transistors 69 and 70. The drains of transistors 69 and 64 may be connected together and the drains of transistor 65 and 70 may be connected together. The size or active area of transistors 64 and 69 have a first ratio (K1) to the active areas of respective transistors 63 and 68, and the active area of transistors 65 and 70 have a second ratio (K2) to the active area of respective transistors 63 and 68. In one embodiment, ratios K1 and K2 are substantially equal and are formed with a ratio of 1:1 to the area of transistors 63 and 68. If current 25 has a positive value, current 62 has a positive value and is flowing from transistor 63 into buffer 59, and vice versa for a negative value of current 62. Some embodiments of comparator 57 may include a bias current such that the value of current 62 may always have a positive value. If current 25 has a positive polarity (such as for example the non-limiting case of a value no less than substantially the potential of terminal 38), comparator 57 is configured to form signal CX to have an asserted state in response to a positive value of current 25 and to be negated in response to a negative value of current 25. Comparator 57 is configured to form the asserted state of signal CX in response to the positive value of current 25 that is greater than Ith and to form the negated state otherwise. Thus, signals CX and CXP can be used to determine the polarity of current 25 in order to determine the polarity of damping voltage to apply to transducer 12. In some embodiments, signal CX can be used to determine the polarity regardless of the state of signal CXP. A current source 72 of comparator 57 forms a threshold current (Ith) that is utilized to determine the threshold value of current 25 that may be used for terminating the closed-loop phase.

Circuit 55 may also be configured to be selectively connected to capacitor 24 in order to charge capacitor 24 and to couple capacitor 24 to transducer 12. A switch 75 of circuit 55 is configured to discharge capacitor 24. For example, circuit 85 (FIG. 10) may be configured to form a control signal to enable switch 75 and discharge capacitor 24 in response to the remainder of the half of the closed-loop cycle, for example as illustrated be step 162 of FIG. 11. A switch 74 is configured to be enabled in order to charge capacitor 24 with closed-loop current 67 that is representative of current 25. Control signals 95 and 96 from controller 85 may be used to control respective switches 74 and 75. For example, circuit 85 (FIG. 10) may be configured to form a control signal to enable switch 74 and charge capacitor 24 in response to detecting the negative-to-positive transitions of current 25 as illustrated by step 164 (FIG. 11) such as for example interpolating between successive zero crossings of voltage 18 or detecting the transition of current 25. Enabling switch 74 charges capacitor 24 with a current that is proportion to current 25. A switch 76 may be configured to be enabled to couple capacitor 24 to transducer 12 in order to apply the closed-loop damping voltage from capacitor 24 to transducer 12. Controller 85 may be configured to form control signals 97 and 98 to control respective switches 77 and 76. Those skilled in the art will appreciate that an embodiment of circuit 55 may be an alternate embodiment of circuit 270.

Transistor 63 has a source connected to receive the operating voltage and a drain commonly connected to a gate of transistor 63 and to a supply terminal of buffer 59. A return terminal of buffer 59 is commonly connected to a drain and gate of transistor 68. A source of transistor 68 is connected to receive the voltage from terminal 38. A source of transistor 69 is commonly connected to the source of transistor 68, the source of transistor 70, a first terminal of current source 72, and a first terminal of switch 75. A gate of transistor 69 is commonly connected to the gate of transistor 68 and a gate of transistor 70. A drain of transistor 69 is commonly connected to signal CXP and a drain of transistor 64. A gate of transistor 64 is commonly connected to the gate of transistor 63 and the gate of transistors 65 and 66. A source of transistor 64 is commonly connected to the source of transistor 63 and the source of transistor 65 and 66. A drain of transistor 65 is connected to output signal CX and to a drain of transistor 70. A second terminal of current source 72 is connected to the drain of transistor 69. A second terminal of switch 75 is commonly connected to a first terminal of switch 74, the first terminal of switch 76, and to input 36. A second terminal of switch 74 is connected to a drain of transistor 66. A second terminal of switch 76 is commonly connected to input 31 and a first terminal of switch 77. A second terminal of switch 77 is connected to the output of buffer 59. In some embodiments, the second terminal of switch 77 may be connected to the output of buffer 59 through an optional resistor 79.

Figure 13:
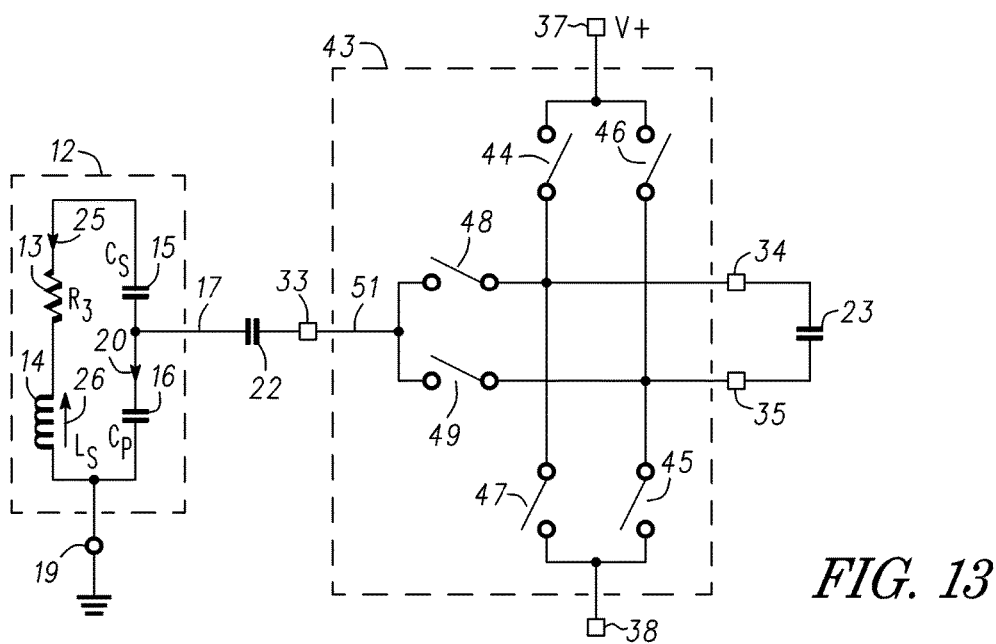
FIG. 13 schematically illustrates an example of an embodiment of a portion of an open-loop damping circuit that may be an alternate embodiment of a portion of an open-loop damping circuit of FIG. 1 or 10 in accordance with the present invention.

FIG. 13 schematically illustrates an example of an embodiment of a portion of an open-loop damping circuit 43 that may be an alternate embodiment of a portion of circuit 42 that was described in the description of FIG. 10. Circuit 43 is configured to form the open-loop damping voltage and to apply the open-loop damping voltage to transducer 12. Circuit 43 is configured to be coupled to capacitor 23 in order to charge and discharge capacitor 23. For example, circuit 43 may be configured to apply the open-loop damping voltage in response to control signals from circuit 85 (FIG. 1). Circuit 43 is also configured to receive the input voltage (V+) from terminal 37 and the common return voltage from terminal 38 in order to assist in charging capacitor 23. Circuit 43 may also be configured to be coupled to at least input/output terminal 17 of transducer 12 in order to apply the damping voltage to transducer 12.

Circuit 43 includes switches 44 and 46 that are commonly connected to terminal 37 and have terminals connected to alternate terminals of capacitor 23. Similarly, switches 45 and 47 are commonly connected to terminal 38 and have terminals connected to alternate terminals of capacitor 23. Switches 48 and 49 are commonly connected to output 33 and have terminals connected to alternate terminals of capacitor 23. Switches 48 and 49 are also configured to be selectively connected to terminal 17 of transducer 12. Those skilled in the art will appreciate that controller 85 (FIG. 10) may be configured to form control signals to enable switches 44 and 45 to charge capacitor 23 with one polarity of voltage or to enable switches 46 and 47 to charge capacitor 23 with an opposite polarity of voltage. Those skilled in the art will additionally appreciate that in an embodiment switches 48 and 49 may be configured to be controlled by signals from circuit 85 to selectively connect capacitor 23 to transducer 12. In an embodiment, circuit 85 may also be configured to enable switches 46 and 48 to connect capacitor 23 in series with the input voltage with a first polarity to transducer 12 or may be configured to disable switches 46 and 48 and to enable switches 44 and 49 to connect capacitor 23 in series with the input voltage with a second polarity to transducer 12. In an embodiment, these capabilities allow using circuit 43 for transmitting and also for open-loop damping. In some embodiments, transmitting and open-loop damping capabilities may be a portion of two or more different circuits. In some embodiments, circuit 43 may be a portion of circuit 42 (FIG. 10). Those skilled in the art will appreciate that an embodiment of circuit 43 may be an embodiment of a circuit that may be configured to apply a fixed charge to transducer 12 as described hereinbefore.

Figure 14:
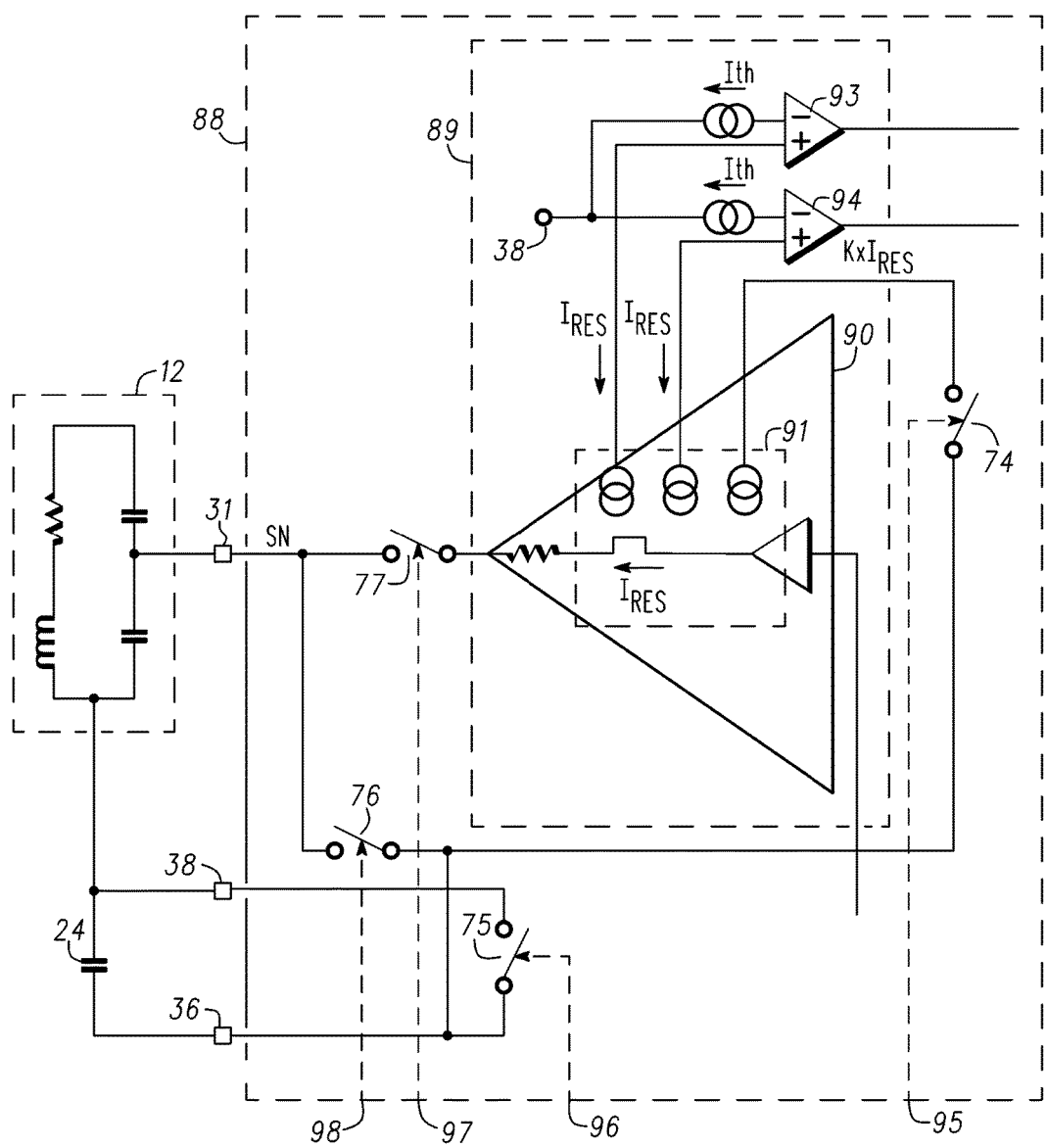
FIG. 14 schematically illustrates an example of an embodiment of a portion of a closed-loop damping circuit that may be an alternate embodiment of at least a portion of the controller of FIG. 1 or 10 in accordance with the present invention.

FIG. 14 schematically illustrates an example of an embodiment of a portion of a monitor and charge circuit 88 that may be an alternate embodiment of at least a portion of circuit 55 that was described in the description of FIG. 12. Circuit 88 is substantially the same as circuit 55 except that circuit 88 includes a current comparator 89 that is an alternate embodiment of comparator 57 of FIG. 11. Comparator 89 includes a buffer 90 that is similar to buffer 59. Buffer 90 receives the signal from transducer 12 that is representative of current 25 and forms currents Ires that are representative of the polarity and value of current 25. An embodiment of buffer 90 may include a current sensing circuit 91 that forms the Ires currents to be proportional to current 25. A current comparator 93 receives one of the Ires signals and asserts signal CX if current 25 is positive. A current comparator 94 receives another one of the Ires signals and asserts signal CXP if the polarity of current 25 is positive and if the value of current 25 is greater than the threshold value (Ith).

Those skilled in the art will understand that under some conditions, current 29 may be representative of current 25. In some embodiments, circuits 265, 280, 55, and 88 of respective FIGS. 6, 8, 12, and 15 may form an embodiment where current 29 is substantially equal to or alternately is representative of current 25. Alternately, some embodiments may include that voltage 18 may be representative of voltage 11 and in some embodiments may be proportional to voltage 11. In some embodiments circuits 225, 260, 270, and 290 of respective FIGS. 4, 5, 7, and 9 may form an embodiment where voltage 18 is proportional to voltage 11.

Figure 15:
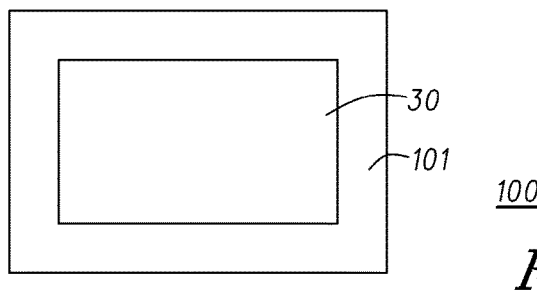
FIG. 15 illustrates an enlarged plan view of a portion of an embodiment of a semiconductor device or integrated circuit that includes the controller of FIG. 1 or 10 in accordance with the present invention.

FIG. 15 illustrates an enlarged plan view of a portion of an embodiment of a semiconductor device or integrated circuit 100 that is formed on a semiconductor die 101. Either of controllers 30 or 203 may be formed on die 101. Die 101 may also include other circuits that are not shown in FIG. 15 for simplicity of the drawing. Controllers 30 and/or 203 and device or integrated circuit 100 are formed on die 101 by semiconductor manufacturing techniques that are well known to those skilled in the art.

Figure 16:
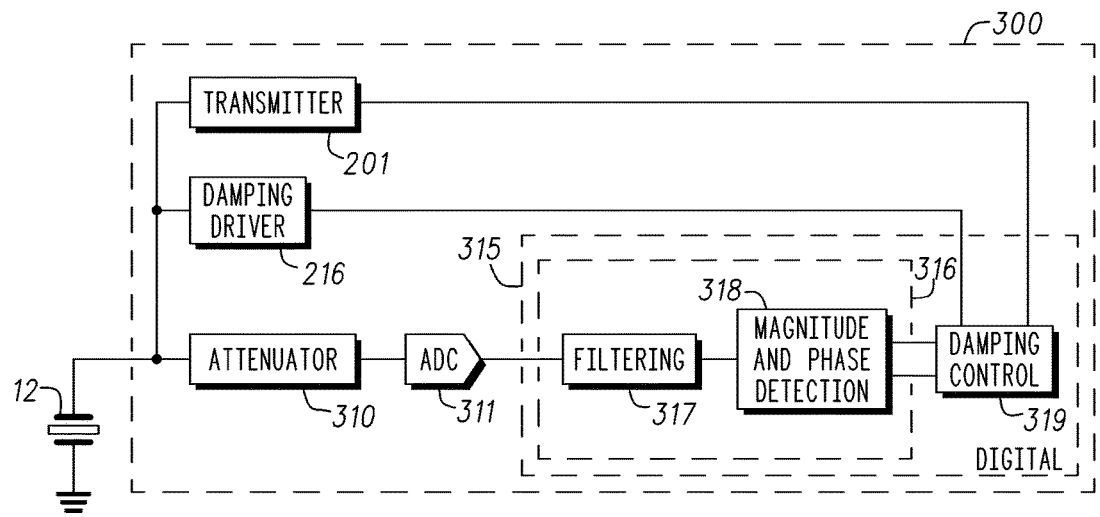
FIG. 16 schematically illustrates an example of an embodiment of a portion of an active damping circuit that may be an alternate embodiment of the controller of FIG. 1 or FIG. 10 in accordance with the present invention.

FIG. 16 schematically illustrates an example of an embodiment of a portion of an active damping circuit 300 that may have an embodiment that may be an alternate embodiment of controller 30 (FIG. 10), controller 203 (FIG. 1). Controller 300 may include a receiver circuit that may be used to receive signals from transducer 12 and form a signal that is representative of the received signal. The receiver circuit may have an embodiment that includes an optional attenuator (ATTN) 310 to adjust the received or amplified signal to a usable value. Attenuator (ATTN) 310 may be omitted in some embodiments. In some embodiments an analog-to-digital converter (ADC) circuit 311 may be used to convert the received signal into a digital signal. Circuit 311 may be configured to receive voltage 18 or a signal that is representative thereof or alternately receive current 25 or a signal that is representative thereof, and convert the signal to a digital value. Controller 300 may also include a controller circuit or control circuit 315 that may be an alternate embodiment of at least a portion of controllers 30 and 205.

In some embodiments, the received signal from transducer 12 may have undesirable high frequency signals, such as harmonics or other signals, that under some conditions may affect the accuracy provided by the controller. It may be advantageous to remove or decrease the effect of these high-frequency signals before they are processed by a control circuit 315. An embodiment of control circuit 315 may include a processing circuit 316, such as for example a digital signal processor, that may be configured to process the received signals using algorithms that implement a method of reducing the high-frequency signals. Processing circuit 315 may include a filtering block 317 and a parameter detection circuit 318. Filtering block 317 may be configured to filter the received signal using a bandpass filter. In some embodiments the bandpass filter may be a narrowband bandpass filter. Parameter detection circuit 318 may be configured to receive the filtered signal and to detect the magnitude and phase of the filtered signal. Circuit 318 may be configured to perform algorithms to implement filtering methods. In some non-limiting example embodiments, the filtering method may include methods for zero intermediate frequency (ZIF) demodulation in the complex domain, correlation detection, or Fourier transform. Control circuit 315 may also be configured to detect or to calculate or to form an estimate of the magnitude and phase of current 25 from the filtered signal and to form the damping signal to reduce the stored energy in transducer 12.

Figure 17:
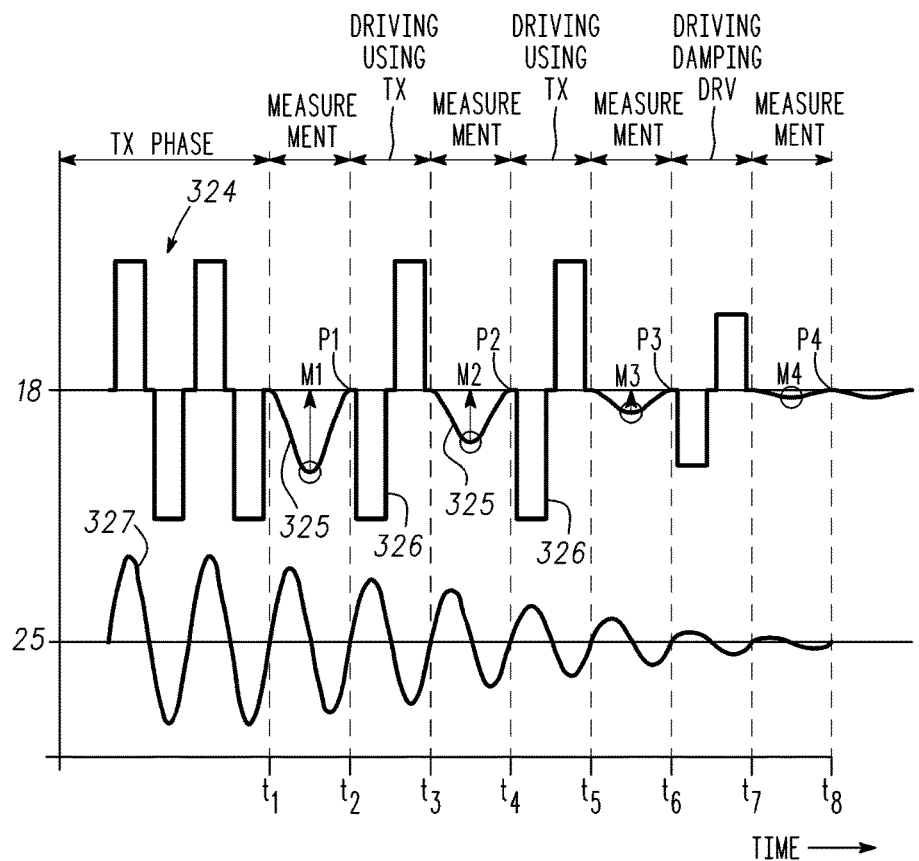
FIG. 17 is a graph having plots that illustrate some of the signals that might be formed during the operation of the controller of FIG. 16 in accordance with the present invention.

FIG. 17 is a graph having plots that illustrate some of the signals that might be formed during the operation of controller 300. A plot 327 illustrates current 25. A plot 324 identified in a general manner by an arrow illustrates example embodiments of the damping signal as a series of signals 326 and example embodiments of the reverberation signal as a series of signals 325. The abscissa indicates time and the ordinate indicates increasing value of the illustrated signal. The plots 325 and 326 illustrate simplified representations of the signals for a portion of an active damping phase.

An embodiment of controller 300 may be configured to receive the reverberation signal during one cycle of the reverberation signal and to determine the magnitude and phase of the reverberation signal. Controller 300 may also be configured to adjust the magnitude and phase of the damping signal responsively to the detected phase and amplitude of the reverberation signal such that the damping voltage is formed with the phase that is substantially opposite to the phase of current 25. For example, the magnitude of the reverberation signal for a present cycle may be compared to the magnitude of the previous cycle to determine a difference in the magnitudes such that the magnitude is decreasing after each damping signal is applied. The magnitude difference may also be used to determine if the damping should be terminated. For example, if the magnitude is less than the threshold magnitude, the damping may be terminated. In some other example embodiments, the damping may be terminated if the magnitude is lower than the magnitude difference. In some embodiments, the magnitude difference between the present cycle and two or more previous cycles may be used to determine if the damping should be terminated. In some embodiments, a small amount of overdamping may be included such that the magnitude difference did not decrease.

For example, as illustrated in FIG. 17 between times t1 and t2, controller 300 may be configured to measure the magnitude M1 and the phase P1 of the reverberation signal during one cycle of the reverberation signal. In some embodiments, the TX driver and the damping driver may be disabled and not driving transducer 12 for the time interval that controller 300 is measuring the magnitude and/or phase of the reverberation signal. The magnitude M1 may be used to adjust the magnitude of the damping signal and the phase P1 is used to determine the timing of the damping signal. During time t2 to t3, controller 300 may be configured to apply the damping signal during the reverberation cycle between t2 to t3 as adjusted from the magnitude M1 and the phase P1 of the prior reverberation cycle. An embodiment may include that controller 300 may be configured to adjust the magnitude of the damping signal if the damping driver is used to drive transducer 12 with the damping signal but not if the Tx driver is used to form drive transducer 12 with the damping signal.

After the damping signal is terminated, controller 300 may be configured to again sample and filter the reverberation signal and determine the magnitude and phase P2 of the reverberation signal during another cycle of the reverberation signal such as illustrated between times t3 to t4. Controller 300 again determines the magnitude difference between M1 and M2 to determine if the magnitude is decreasing and uses the magnitude difference to adjust the amplitude of the subsequent drive signal. Controller 300 also uses the phase P2 to determine the timing for applying the damping signal for the subsequent reverberation cycle as illustrated between times t4 to t5. Controller 300 may include embodiments that are configured to apply a damping signal having a fixed amount of energy to transducer 12 as long as the magnitude of the reverberation signal is greater than a magnitude threshold amount, and thereafter to form the amount of energy in the damping signal to be proportional to the magnitude of the reverberation signal. For example, as is illustrated between times t4 to t5 and t6 to t7, controller 300 may be configured to decrease the amplitude of the damping signal in response to the decrease in the magnitude of the reverberation signal. Decreasing the energy of the damping signal in response to the amplitude of the reverberation signal assist in reducing the stored energy in transducer 12 and not adding additional energy to transducer 12. This sequence of measuring the reverberation signal during one cycle and applying the drive signal during the next cycle continues on to the magnitude of the reverberation signal becomes less than a termination threshold amount.

Figure 18:
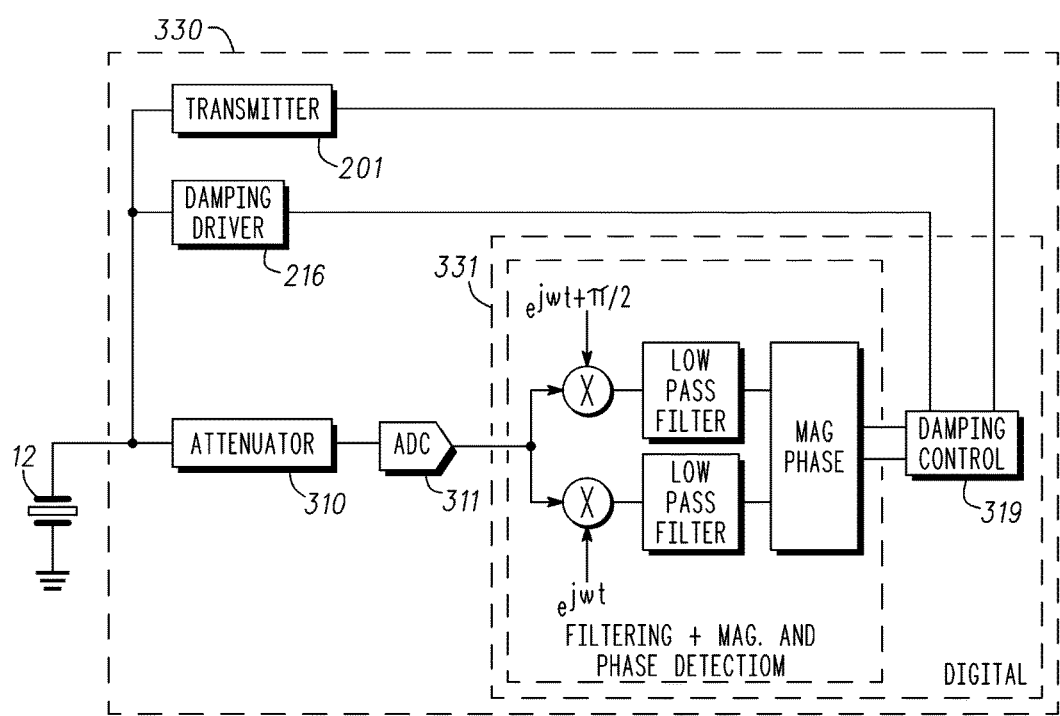
FIG. 18 schematically illustrates an example of an embodiment of a portion of a transducer controller circuit that may be an alternate embodiment of the controller of FIG. 16 in accordance with the present invention.

FIG. 18 schematically illustrates an example of an embodiment of a portion of a transducer controller circuit 330 that may include an embodiment that may be an alternate embodiment of controller 300 (FIG. 16). Controller 330 is similar to and operates substantially similar to controller 300 except that controller 330 includes a control circuit 331 that includes a more detailed implementation of a filtering circuit and a parameter detection circuit.

Those skilled in the art will appreciate that a controller for an acoustic transducer may comprise:

the controller configured to form a drive signal to drive the acoustic transducer during a drive phase; and an open loop damping circuit configured apply predefined amount of charge to the acoustic transducer in response to a substantially zero crossing of a circulating current within the acoustic transducer, the closed loop damping circuit configured to form a variable charge based on acoustic transducer energy state and to apply the controlled charge amount to the acoustic transducer to provide residual energy declination within the acoustic transducer.

An embodiment may include that the damping circuit includes a plurality of switches configured to form the fixed charge, and to cyclically apply this charge to the acoustic transducer in response to the substantially zero crossing of the circulating current.

In an embodiment, the damping circuit may be configured to form a closed-loop that controls amount of charge based on residual energy of the acoustic transducer and to apply it to the acoustic transducer in response to the substantially zero crossing of the circulating current.

An embodiment may include that the damping circuit includes a plurality of switches configured to charge a first capacitor to a first voltage to form the initial charge, and to cyclically apply the first capacitor to the acoustic transducer in response to the substantially zero crossing of the circulating current without recharging the first capacitor between applications to the acoustic transducer.

The damping circuit may include an embodiment that may be configured to form a closed-loop charging capacitor proportional with current circulating within the acoustic transducer current forming variable charge proportional to acoustic transducer residual energy and applying this charge to the acoustic transducer in response to the substantially zero crossing of the circulating current.

In an embodiment the damping circuit may include a current comparator configured to receive a first input signal that is representative of the circulating current and to determine if the circulating current has a positive value or a negative value and to determine if a value of the circulating current is greater than a threshold value.

The current comparator may have an embodiment that includes a first switch coupled to a closed-loop capacitor and configured to be enabled to couple the closed-loop capacitor to the acoustic transducer wherein the first switch is enabled in response to detecting the positive to negative transition of the circulating current.

In an embodiment the current comparator may include a buffer that receives the first input signal and forms a first current that is representative of the first input signal.

The controller may have an embodiment that includes the damping circuit includes a switch coupled in parallel with a closed-loop capacitor.

Those skilled in the art will also appreciate that a method of forming a transducer controller for an acoustic transducer may comprise:

configuring the transducer controller to form a transmission phase, a damping phase, and a distance measuring phase wherein the transducer controller is configured to form a drive signal to drive the acoustic transducer during the transmission phase; and configuring the transducer controller to, during the damping phase and prior to the distance measuring phase, apply a damping signal to the acoustic transducer wherein the damping signal has a polarity that substantially decreases a residual energy of the acoustic resonator.

The method may have an embodiment that includes configuring the transducer controller to receive a signal from the acoustic transducer that is representative of the circulating current and to apply a damping signal in response to a substantially zero crossing of the circulating current.

An embodiment of the method may also include configuring the transducer controller to apply the damping signal for at least a portion of a half of a cycle of the circulating current.

In an embodiment the method may include configuring the transducer controller to apply a fixed charge to the acoustic transducer during an open-loop sub-phase of the damping phase and to apply a variable charge that is representative of residual energy stored in the acoustic transducer during a closed-loop sub-phase of the damping phase.

An embodiment may also include configuring the transducer controller to apply a variable charge that is representative of residual energy stored in the acoustic transducer during a closed-loop sub-phase of the damping phase including configuring the controller to apply the variable charge responsively to a circulating current in transducer changing polarity.

In an embodiment, the method may include that the transducer controller may be configured to apply the variable charge in response to each changing polarity of the circulating current until a value of the circulating current is no greater than a threshold value.

The method may include that the closed-loop sub-phase may follow an open-loop sub-phase.

An embodiment of the method may include that the damping phase follows the transmit phase and precedes the distance measuring phase.

In an embodiment the transducer controller may be configured to apply the damping signal with a polarity leading to decreasing of residual energy of the acoustic resonator is substantially aligned with a polarity transition of the circulating current.

Those skilled in the art will also appreciate that a method of forming a transducer controller for an acoustic transducer may comprise configuring the transducer controller to form a drive signal to drive the transducer to form a transmitted acoustic signal; and configuring the transducer controller to apply a damping signal to the acoustic transducer to reduce a residual energy in the acoustic transducer.

The method may also include an embodiment that may include configuring the controller to receive a signal that is representative of one of a circulating current resulting from the stored energy or an induced voltage resulting from the stored energy.

The method may have an embodiment that includes configuring the transducer controller to apply the damping signal having a positive-to-negative transition that substantially aligns with one of a peak negative value of the induced voltage or a negative-to-positive transition of the circulating current.

In an embodiment, the method may include configuring the transducer controller to apply the damping signal as one of a fixed charge or a variable charge that varies proportionally to the residual stored energy into transducer.

From all the foregoing, one skilled in the art will understand that a controller for an acoustic transducer may comprise:

the controller configured to form a drive signal to drive the acoustic transducer during a drive phase; and a damping circuit configured to form a fixed charge and to apply the fixed charge to the acoustic transducer in response to a substantially zero crossing of a circulating current within the acoustic transducer, the damping circuit configured to form a variable charge and to apply the variable charge to the acoustic transducer in response to a positive to negative transition of the circulating current.

An embodiment of the controller may include that the damping circuit includes a plurality of switches configured to charge a first capacitor to a first voltage to form the fixed charge, and to cyclically apply the first capacitor to the acoustic transducer in response to the substantially zero crossing of the circulating current without recharging the first capacitor between applications to the acoustic transducer.

In an embodiment the damping circuit may be configured to form a closed-loop current that is representative of the circulating current and to charge a closed-loop capacitor with the closed-loop current to form the variable charge.

The damping circuit may include an embodiment having a current comparator configured to receive a first input signal that is representative of the circulating current and to determine if the circulating current has a positive value or a negative value and to determine if a value of the circulating current is greater than a threshold value.

In an embodiment, the current comparator may include a first switch coupled to a closed-loop capacitor and configured to be enabled to couple the closed-loop capacitor to the acoustic transducer wherein the first switch is enabled in response to detecting the positive to negative transition of the circulating current.

The current comparator may have an embodiment that includes a buffer that receives the first input signal and forms a first current that is representative of the first input signal.

In an embodiment the damping circuit may include a switch coupled in parallel with a closed-loop capacitor.

Those skilled in the art will also appreciate that a method of forming a transducer controller for an acoustic transducer may comprise:

configuring the transducer controller to form a transmission phase, a damping phase, and a distance measuring phase wherein the transducer controller is configured to form a drive signal to drive the acoustic transducer during the transmission phase; and configuring the transducer controller to, during the damping phase and prior to the distance measuring phase, apply a damping signal to the acoustic transducer wherein the damping signal is substantially opposite in polarity to a polarity of a circulating current of the acoustic transducer.

The method may also include configuring the transducer controller to receive a signal from the acoustic transducer that is representative of the circulating current and to apply a damping voltage in response to a substantially zero crossing of the circulating current.

An embodiment of the method may include configuring the transducer controller to apply the damping signal for at least a portion of a half of a cycle of the circulating current.

In an embodiment, the method may include configuring the transducer controller to apply a fixed charge to the acoustic transducer during an open-loop sub-phase of the damping phase and to apply a variable charge that is representative of residual energy stored in the acoustic transducer during a closed-loop sub-phase of the damping phase.

The method may have an embodiment that includes configuring the transducer controller to apply a variable charge that is representative of residual energy stored in the acoustic transducer during a closed-loop sub-phase of the damping phase including configuring the controller to apply the variable charge responsively to a circulating current in transducer changing polarity.

The method may include configuring the controller to apply the variable charge in response to each changing polarity of the circulating current until a value of the circulating current is no greater than a threshold value.

The method may include configuring the closed-loop sub-phase to follow an open-loop sub-phase.

An embodiment of the method may include configuring the controller to form the damping phase following the transmit phase and preceding the distance measuring phase.

The method may also include configuring the transducer controller to apply the damping signal with a positive-to-negative transition of the damping signal are substantially aligned with a negative-to-positive transition of the circulating current.

Those skilled in the art will also understand that a method of forming a transducer controller for an acoustic transducer may comprise:

configuring the transducer controller to form a drive signal to drive the transducer to form a transmitted acoustic signal; and configuring the transducer controller to apply a damping signal to the acoustic transducer to reduce a stored energy in the acoustic transducer.

The method may also include configuring the transducer controller to receive a signal that is representative of one of a circulating current resulting from the stored energy or an induced voltage resulting from the stored energy.

An embodiment the method may include configuring the transducer controller to apply the damping signal having a positive-to-negative transition that substantially aligns with one of a peak negative value of the induced voltage or a negative-to-positive transition of the circulating current.

In an embodiment, the method may include configuring the transducer controller to apply the damping signal as one of a fixed charge or a variable charge that varies proportionally to the stored energy into transducer.

In view of all of the above, it is evident that a novel device and method is disclosed. Included, among other features, is forming a transducer controller to apply a damping signal to the transducer that has a polarity that is opposite to a polarity of a circulating current formed by the transducer during a reverberation phase of the transducer. Applying the damping signal assists in dissipating energy stored in the transducer and assists in reducing the time interval during which the transducer reverberates. In some embodiments, the transducer controller may be configured to apply an open-loop signal irrespective of the value of the circulating current or voltage of the transducer. The open-loop signal assists in rapidly dissipating the stored energy. In an embodiment, the transducer controller may be configured to apply the open-loop signal and then apply a closed-loop signal that is formed to have a value that is proportional to the circulating current formed by the transducer. The closed-loop signal assists in only applying sufficient energy to dissipate the stored energy and to minimize adding any energy to the transducer. All of these singularly or together reduce the time interval of the reverberations of the transducer. Reducing the time interval facilitates improving the accuracy of distance measurements performed by the transducer. Additionally, the damping formed by the controller does not affect the signal used from the transducer during the measurement phase, thus, the magnitude and phase of the received signal during the measurement phase is not affected which further improves the accuracy of the measurements.

While the subject matter of the descriptions are described with specific preferred embodiments and example embodiments, the foregoing drawings and descriptions thereof depict only typical and examples of embodiments of the subject matter and are not therefore to be considered to be limiting of its scope, it is evident that many alternatives and variations will be apparent to those skilled in the art. As will be appreciated by those skilled in the art, the example form of systems 10 and 200, and controllers 30 and 203 are used as a vehicle to explain the apparatus and the operation method of reducing the time interval of the reverberations of the transducer. Those skilled in the art will appreciate that in an embodiment, controllers 30 and 203 may be configured to form only the damping phase. Those skilled in the art will appreciate that the forgoing detailed descriptions included charging capacitor 24 in response to a positive polarity of current 25 and to discharge capacitor 24 in response to a negative polarity of current 25.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A controller for an acoustic transducer comprising:
   the controller configured to form a drive signal to drive the acoustic transducer during a drive phase; and
   a damping circuit configured to form a fixed charge and to apply the fixed charge to the acoustic transducer in response to a substantially zero crossing of a circulating current within the acoustic transducer, the damping circuit configured to form a variable charge and to apply the variable charge to the acoustic transducer in response to a positive to negative transition of the circulating current.

2. The controller of claim 1 wherein the damping circuit includes a plurality of switches configured to charge a first capacitor to a first voltage to form the fixed charge, and to cyclically apply the first capacitor to the acoustic transducer in response to the substantially zero crossing of the circulating current without recharging the first capacitor between applications to the acoustic transducer.

3. The controller of claim 1 wherein the damping circuit is configured to form a closed-loop current that is representative of the circulating current and to charge a closed-loop capacitor with the closed-loop current to form the variable charge.

4. A controller for an acoustic transducer comprising:
   the controller configured to form a drive signal to drive the acoustic transducer during a drive phase; and
   a damping circuit configured to form a fixed charge and to apply the fixed charge to the acoustic transducer in response to a substantially zero crossing of a circulating current within the acoustic transducer, the damping circuit configured to form a variable charge and to apply the variable charge to the acoustic transducer in response to a positive to negative transition of the circulating current wherein the damping circuit includes a current comparator configured to receive a first input signal that is representative of the circulating current and to determine if the circulating current has a positive value or a negative value and to determine if a value of the circulating current is greater than a threshold value.

5. The controller of claim 4 wherein the current comparator includes a first switch coupled to a closed-loop capacitor and configured to be enabled to couple the closed-loop capacitor to the acoustic transducer wherein the first switch is enabled in response to detecting the positive to negative transition of the circulating current.

6. The controller of claim 4 wherein the current comparator includes a buffer that receives the first input signal and forms a first current that is representative of the first input signal.

7. A controller for an acoustic transducer comprising:
the controller configured to form a drive signal to drive the acoustic transducer during a drive phase; and
a damping circuit configured to form a fixed charge and to apply the fixed charge to the acoustic transducer in response to a substantially zero crossing of a circulating current within the acoustic transducer, the damping circuit configured to form a variable charge and to apply the variable charge to the acoustic transducer in response to a positive to negative transition of the circulating current, the damping circuit including a switch coupled in parallel with a closed-loop capacitor.

8. The controller of claim 1 wherein the controller forms the variable charge to be representative of stored energy remaining in the acoustic transducer.

9. The controller of claim 1 wherein the controller is configured to apply the fixed charge prior to applying the variable charge.

10. The controller of claim 1 wherein the controller also includes a driver circuit to form the drive signal.

11. The controller of claim 10 wherein the damping circuit assists in forming the drive signal.

12. The controller of claim 1 wherein the damping circuit measures a frequency of the circulating current.

13. The controller of claim 12 wherein the damping circuit changes a frequency of applying either the fixed charge or the variable charge in response to a change in the frequency of the circulating current.

14. The controller of claim 4 wherein the controller includes a sensor circuit for forming the first input signal that is representative of the circulating current.

15. The controller of claim 4 wherein the damping circuit includes a resistor coupled to receive the signal that is representative of the circulating current and forms a voltage that is representative of the circulating current.

16. The controller of claim 15 wherein the damping circuit includes an integrator coupled to integrate the voltage.

17. The controller of claim 4 wherein the damping circuit includes a zero crossing detector configured to detect the zero crossing of the circulating current.

18. The controller of claim 4 wherein the damping circuit includes a damping driver that forms a damping signal to drive the acoustic transducer with the fixed charge of the variable charge.

19. The controller of claim 18 wherein the damping drive assists in forming the drive signal.

20. A controller for an acoustic transducer comprising:
the controller configured to form a drive signal to drive the acoustic transducer during a drive phase; and
a damping circuit configured to form a fixed charge and to apply the fixed charge to the acoustic transducer in response to a substantially zero crossing of a circulating current within the acoustic transducer wherein the damping circuit detects each zero crossing of the circulating current, the damping circuit configured to form a variable charge and to apply the variable charge to the acoustic transducer in response to a positive to negative transition of the circulating current.

* * * * *